(12) United States Patent
Park et al.

(10) Patent No.: US 9,367,534 B2
(45) Date of Patent: Jun. 14, 2016

(54) MOBILE TERMINAL AND METHOD FOR CONTROLLING THE SAME

(75) Inventors: Jin Woo Park, Seoul (KR); Young Jun Kim, Seoul (KR); Ji Sun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/878,909

(22) Filed: Sep. 9, 2010

(65) Prior Publication Data

US 2011/0078568 A1 Mar. 31, 2011

(30) Foreign Application Priority Data

Sep. 30, 2009 (KR) ........................ 10-2009-0093053

(51) Int. Cl.
*G06F 17/24* (2006.01)
*G06F 3/0488* (2013.01)
*G06F 3/01* (2006.01)

(52) U.S. Cl.
CPC .......... *G06F 17/243* (2013.01); *G06F 3/04883* (2013.01); *G06F 3/017* (2013.01)

(58) Field of Classification Search
CPC ......... G06F 3/048; G06F 3/033; G06F 17/00; G06F 3/0483; G06F 3/0481; G06F 2340/12; G06F 3/04842; G06F 3/0237; G06F 2340/0407; G06F 3/0482; G06F 3/0485; G06F 3/04817; G06F 3/04847; G06F 17/243; G06F 3/017

USPC ................................. 715/780, 863, 773, 827
See application file for complete search history.

(56) References Cited

U.S. PATENT DOCUMENTS

| | | | | |
|---|---|---|---|---|
| 5,276,794 A * | 1/1994 | Lamb, Jr. | ...................... | 715/202 |
| 5,778,404 A * | 7/1998 | Capps et al. | ................... | 715/234 |
| 5,990,873 A * | 11/1999 | Yamamoto et al. | ............ | 345/173 |
| 6,128,007 A * | 10/2000 | Seybold | ........................ | 345/179 |
| 6,707,942 B1 * | 3/2004 | Cortopassi et al. | ........... | 382/186 |
| 8,140,994 B2 * | 3/2012 | Feldman et al. | ............... | 715/780 |
| 2004/0186729 A1 | 9/2004 | Park et al. | | |
| 2008/0155480 A1 * | 6/2008 | Van Wyk et al. | .............. | 715/863 |
| 2008/0174570 A1 * | 7/2008 | Jobs et al. | ...................... | 345/173 |
| 2010/0020033 A1 * | 1/2010 | Nwosu | .......................... | 345/173 |
| 2010/0125811 A1 * | 5/2010 | Moore et al. | .................. | 715/846 |
| 2010/0287486 A1 * | 11/2010 | Coddington | ................... | 715/769 |
| 2010/0306714 A1 * | 12/2010 | Latta et al. | ..................... | 715/863 |

FOREIGN PATENT DOCUMENTS

| | | | |
|---|---|---|---|
| KR | 10-2009-0034215 A | | 4/2009 |
| KR | 10-2009-0035570 A | | 4/2009 |

* cited by examiner

*Primary Examiner* — Doon Chow
*Assistant Examiner* — Le Nguyen
(74) *Attorney, Agent, or Firm* — Birch, Stewart, Kolasch & Birch, LLP

(57) ABSTRACT

A mobile terminal and a method for controlling the same are disclosed, where symbols used often when inputting characters and pointer position moving are input simultaneously by using a touch gesture of a user, such that character input may be accelerated.

19 Claims, 25 Drawing Sheets

FIG. 7
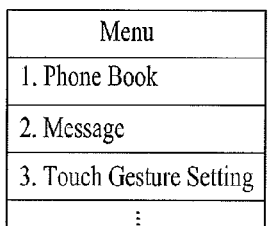
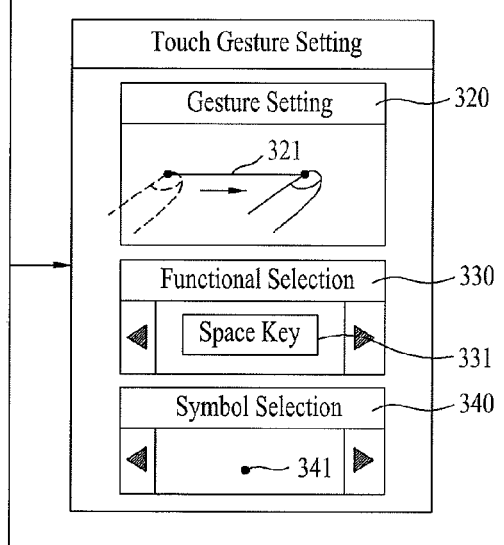
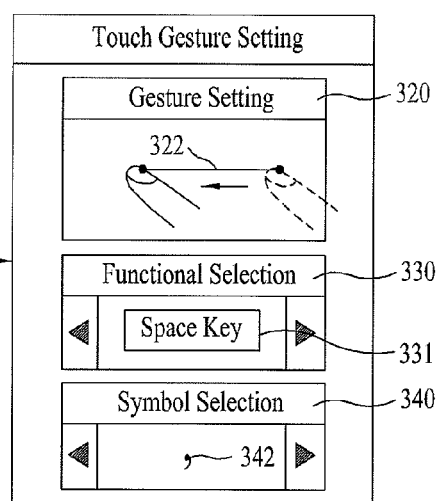
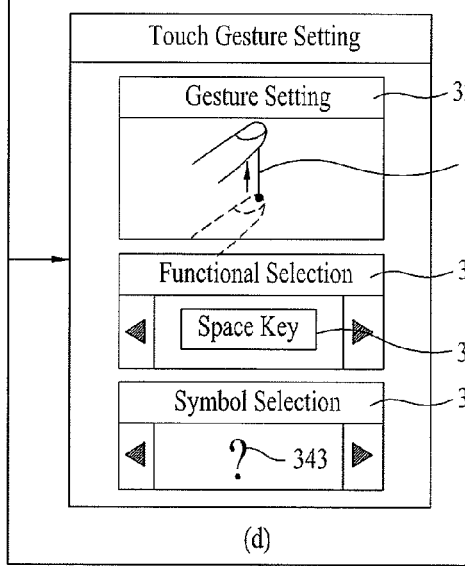
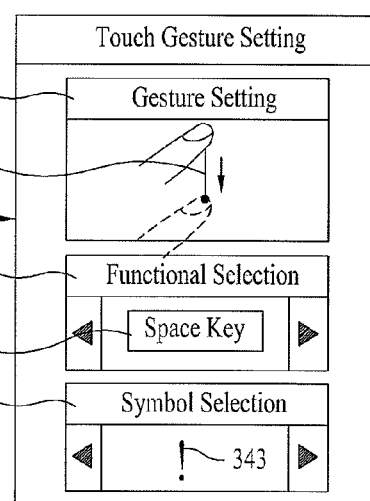

FIG. 8
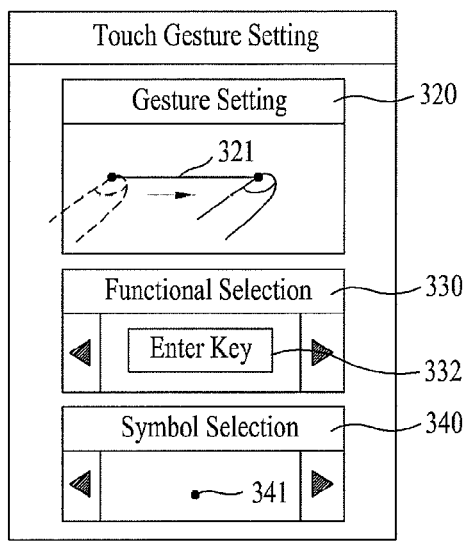
(a)
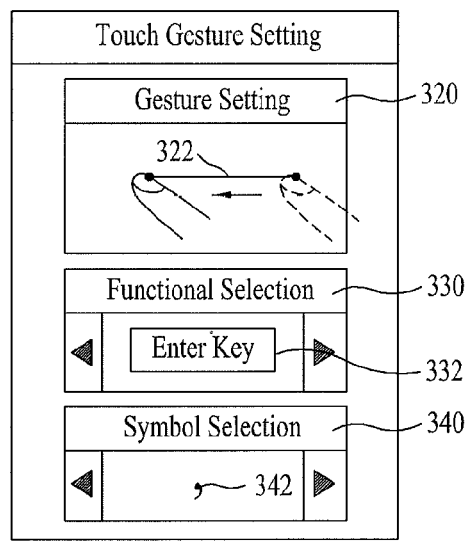
(b)
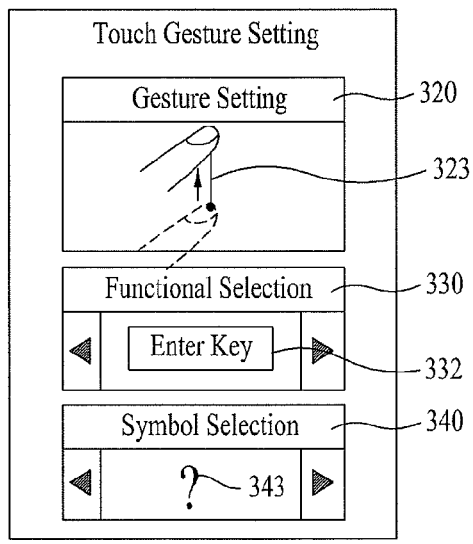
(c)
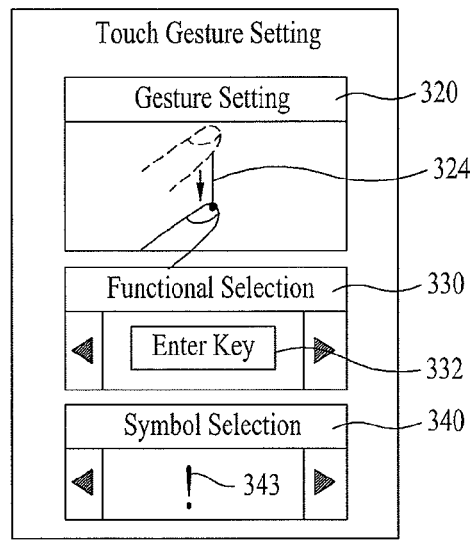
(d)

FIG. 10
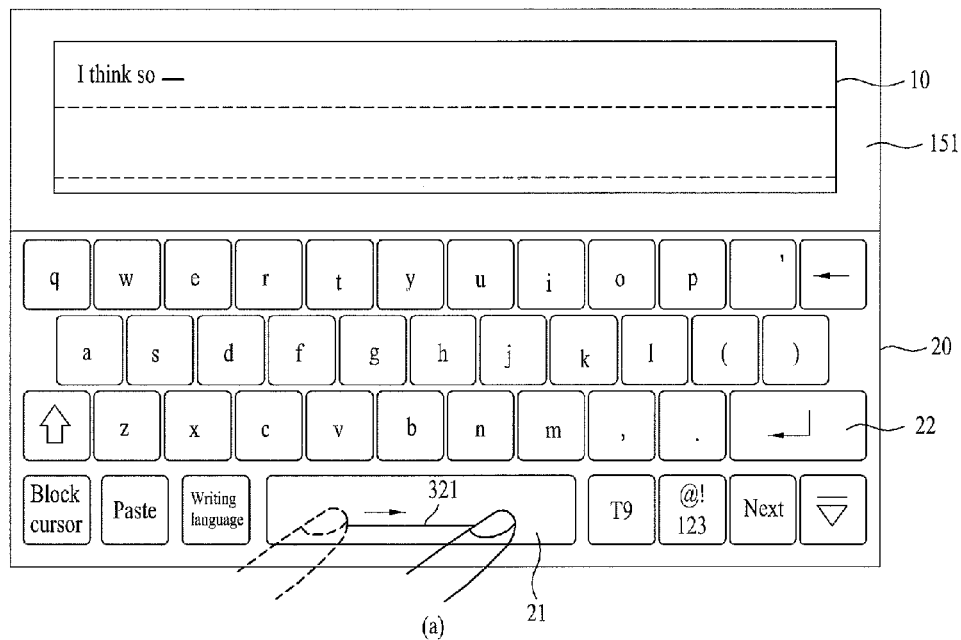
(a)
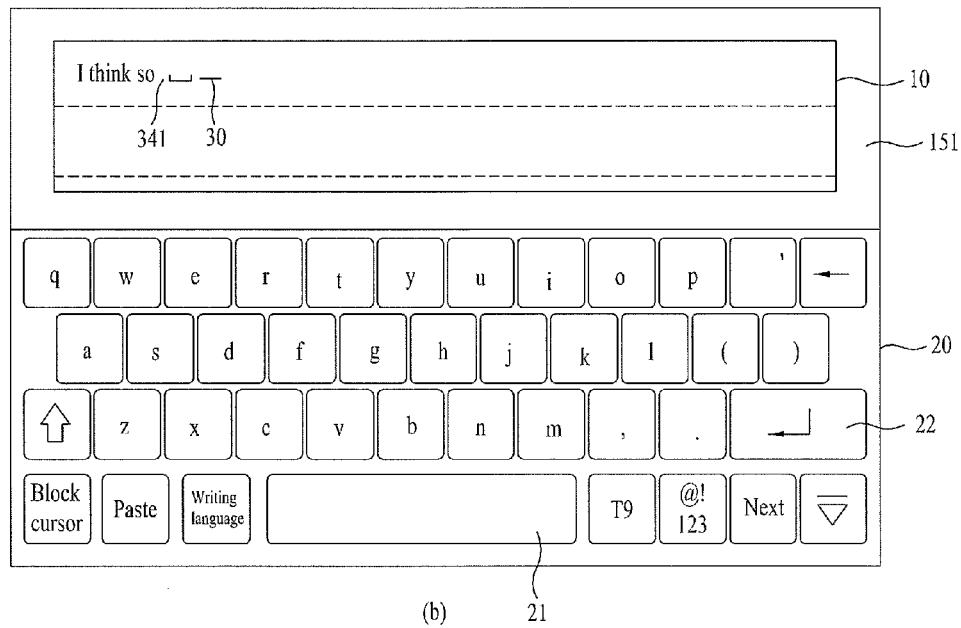
(b)

FIG. 11
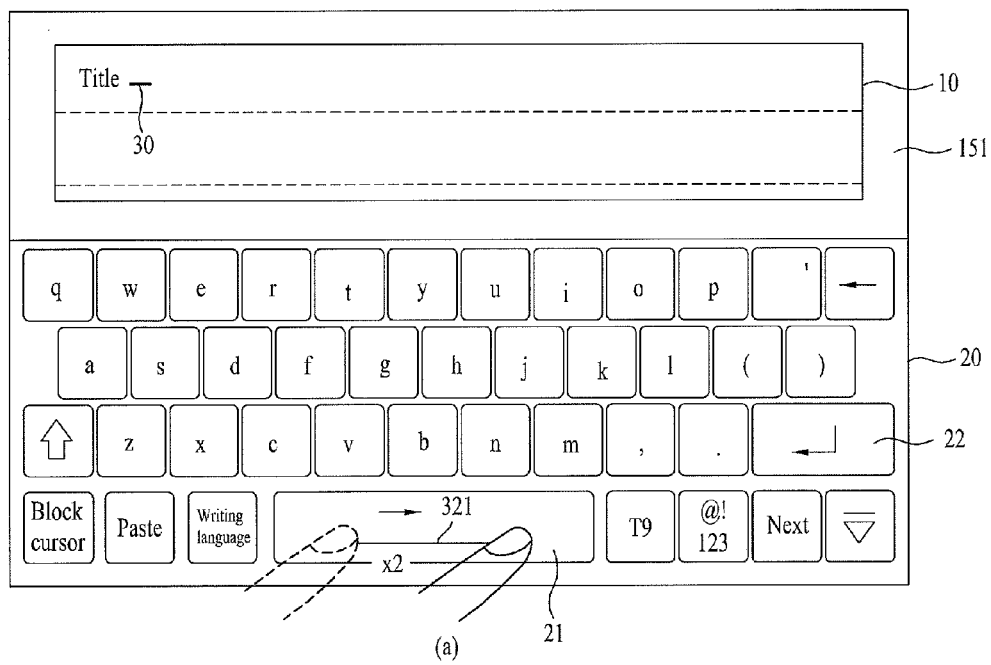
(a)
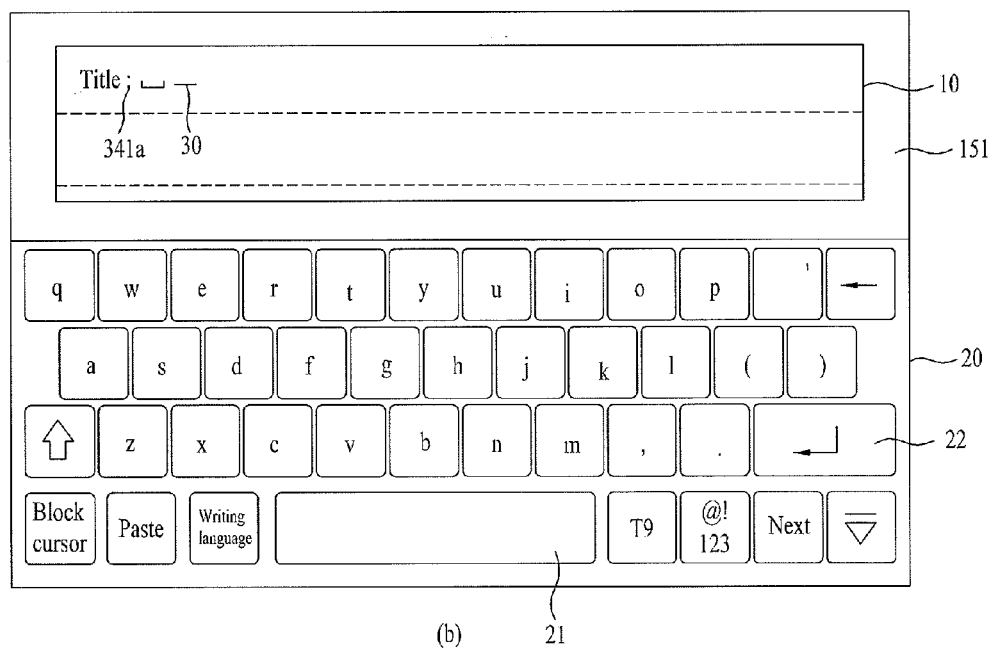
(b)

FIG. 12
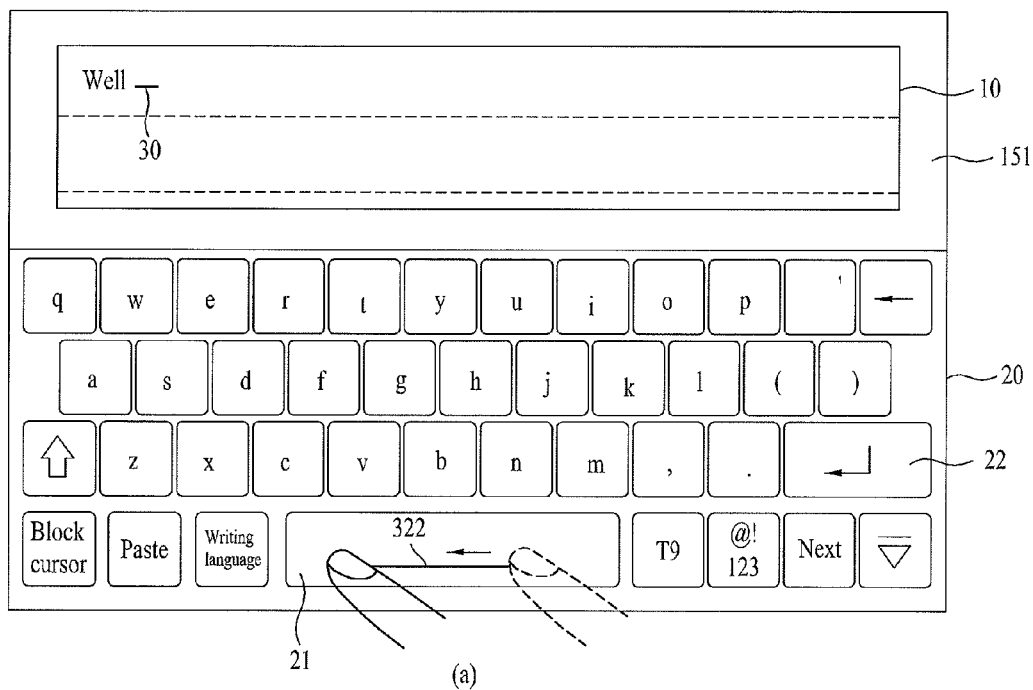
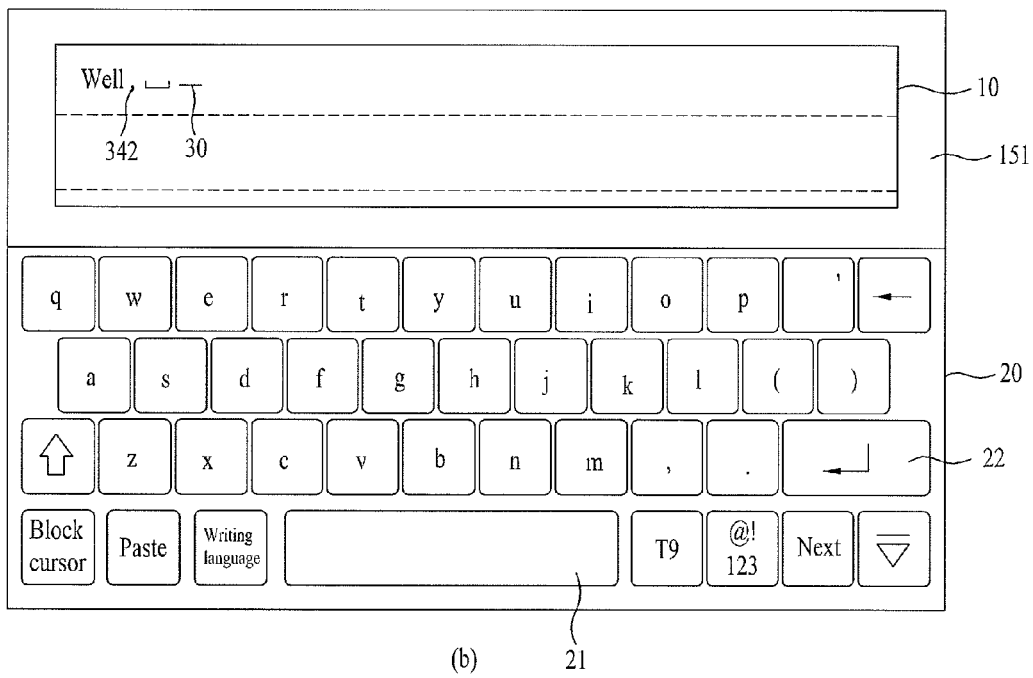

FIG. 19
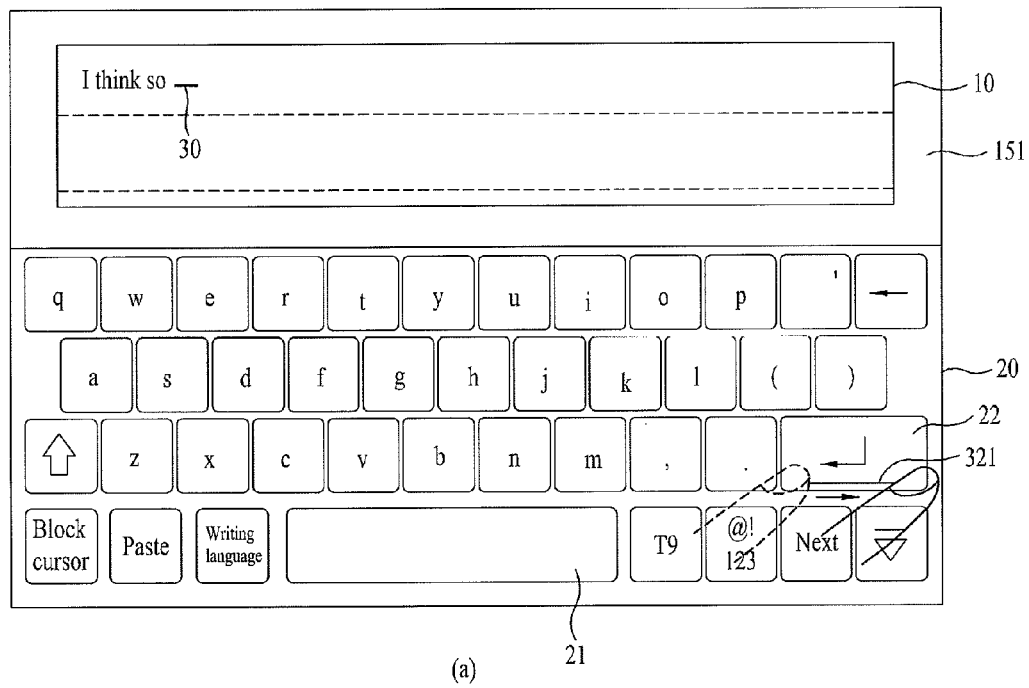
(a)
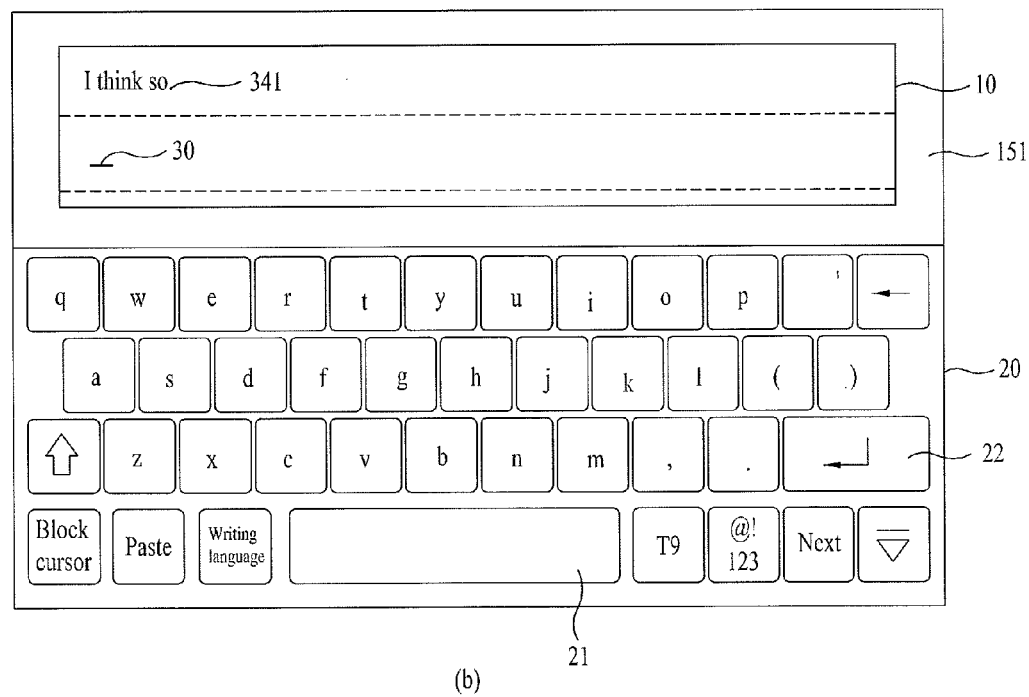
(b)

FIG. 20
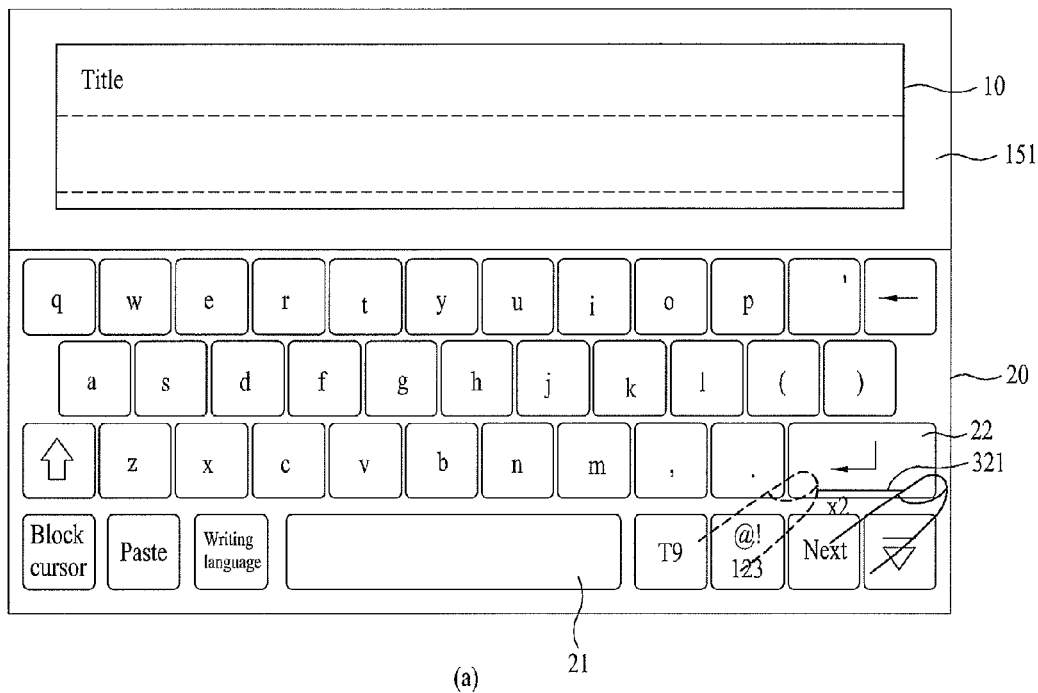
(a)
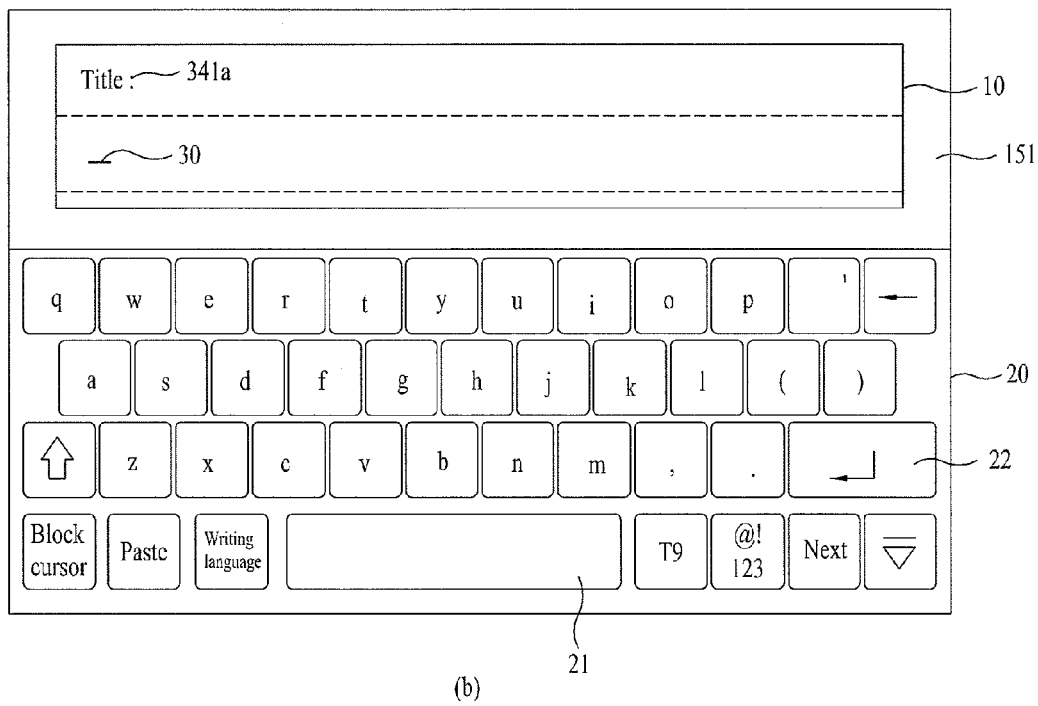
(b)

FIG. 21
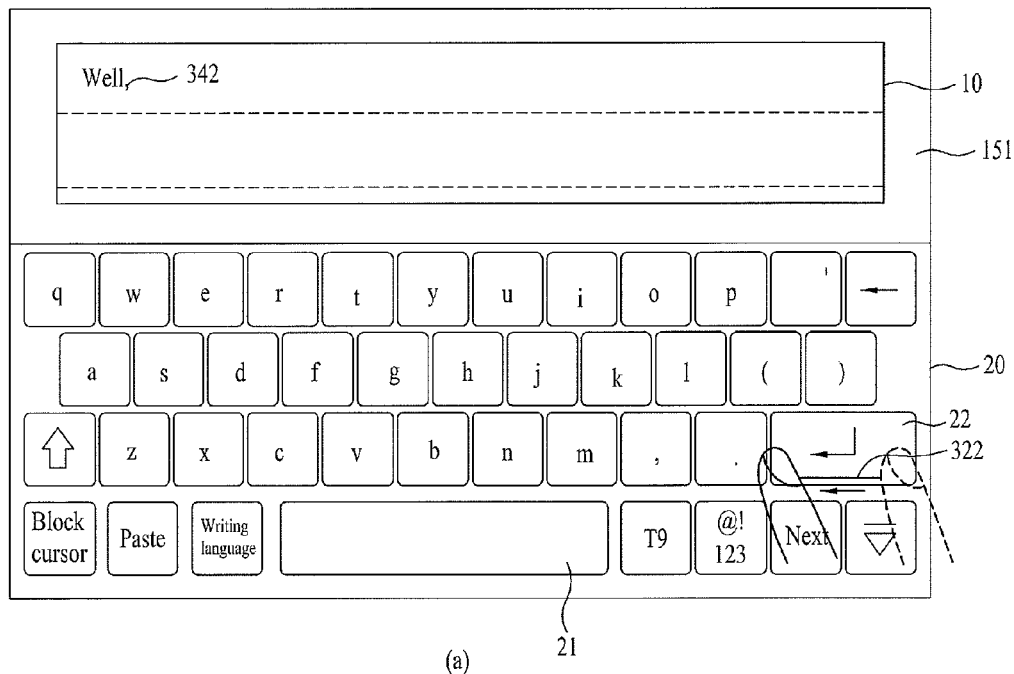
(a)
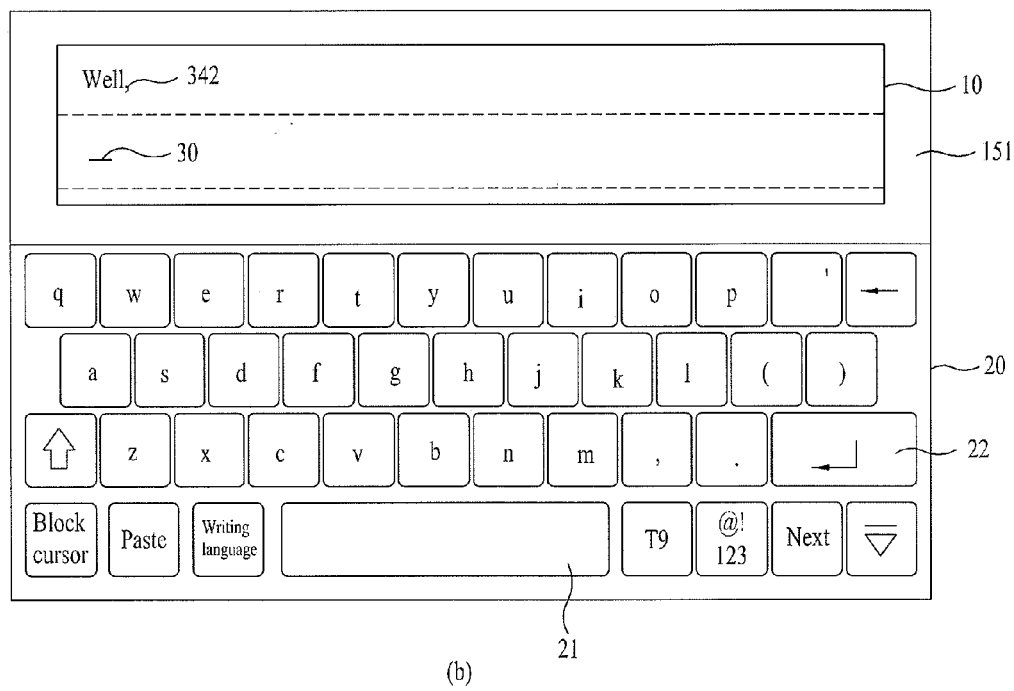
(b)

FIG. 22
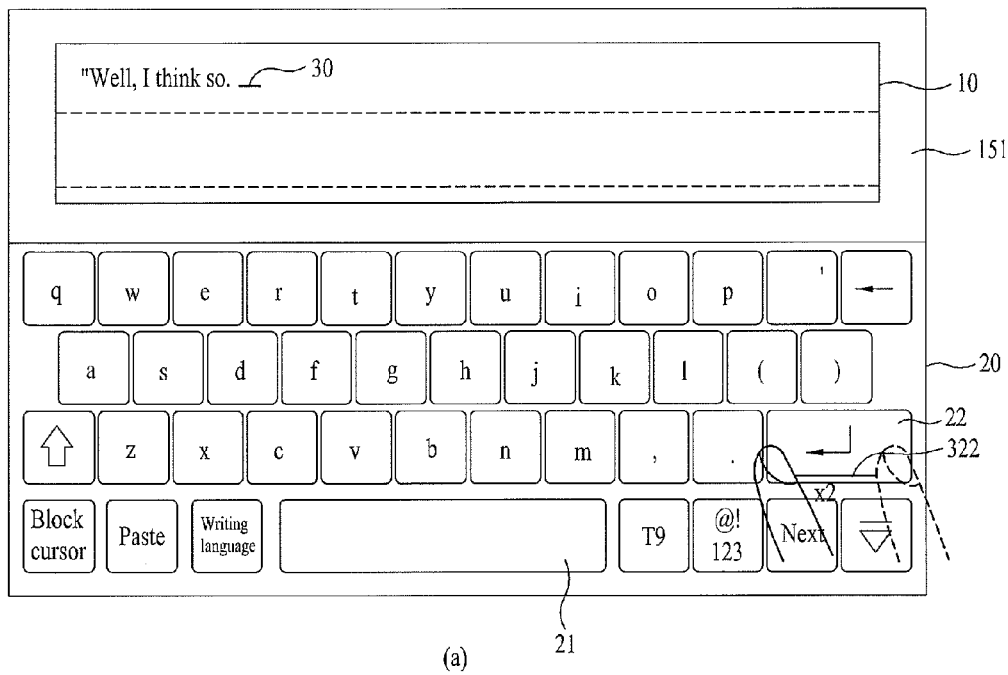
(a)
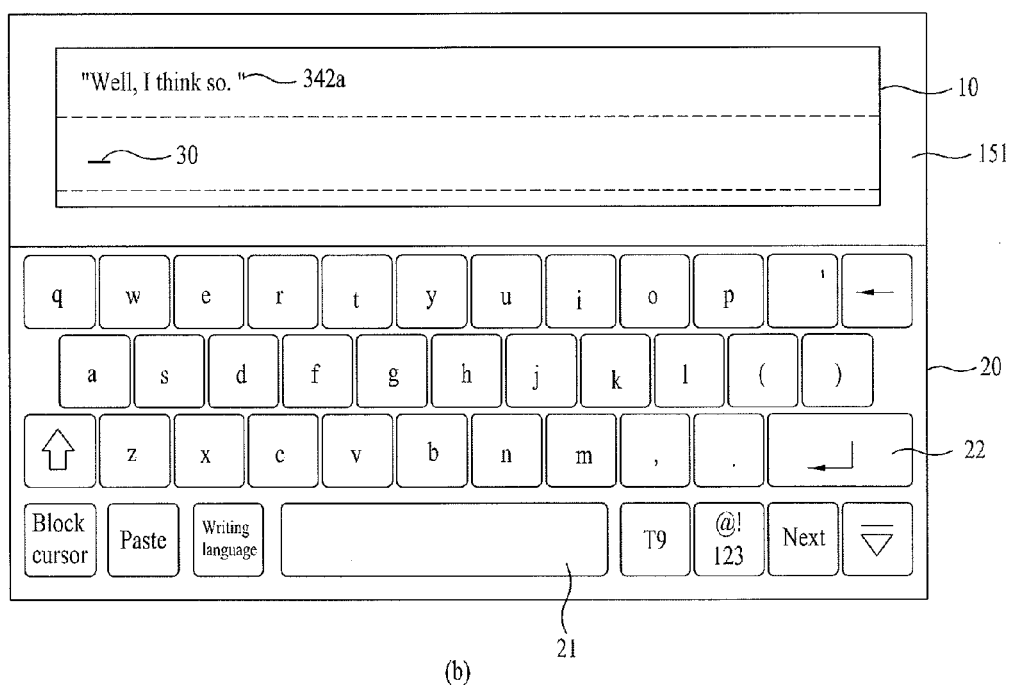
(b)

FIG. 23
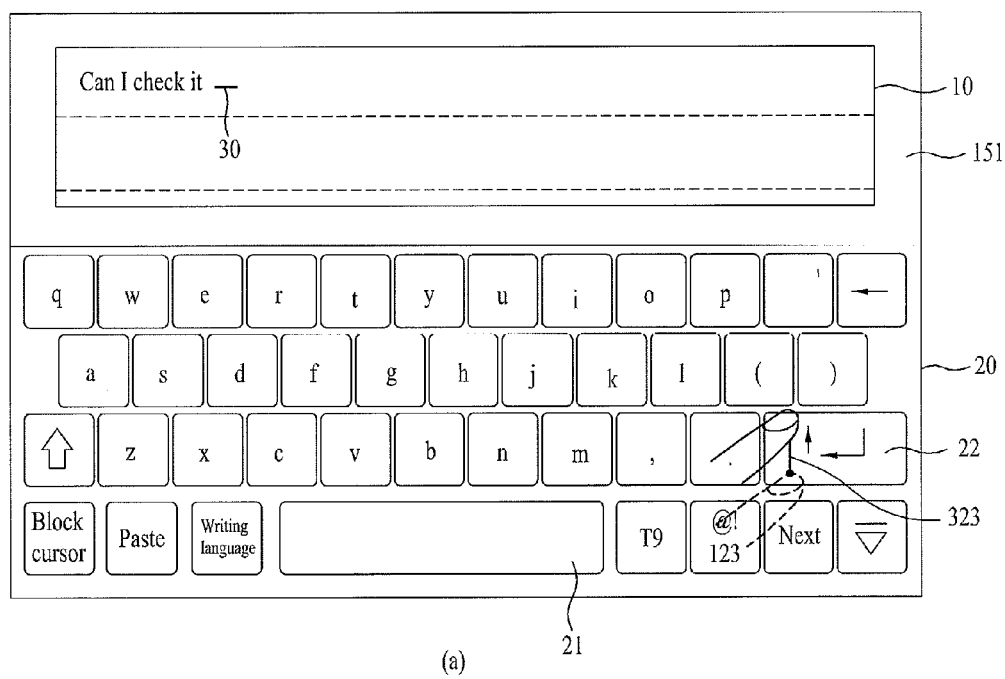
(a)
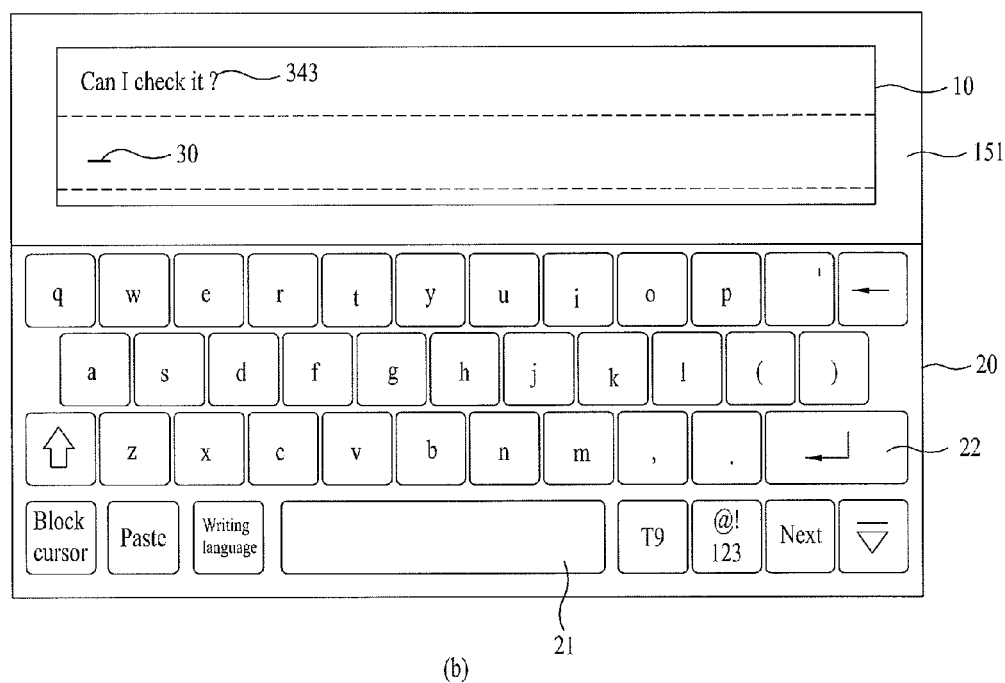
(b)

FIG. 24
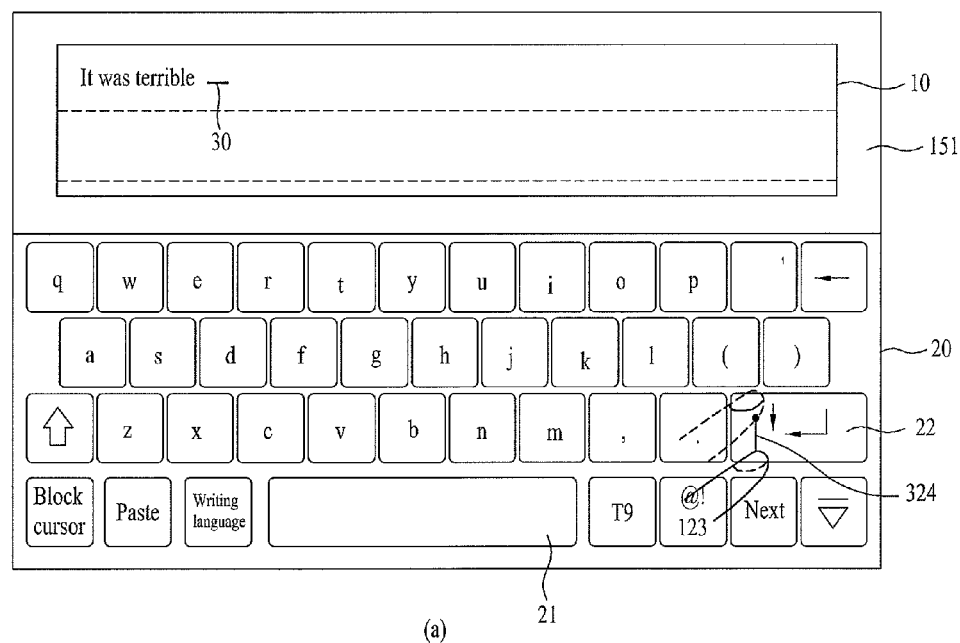
(a)
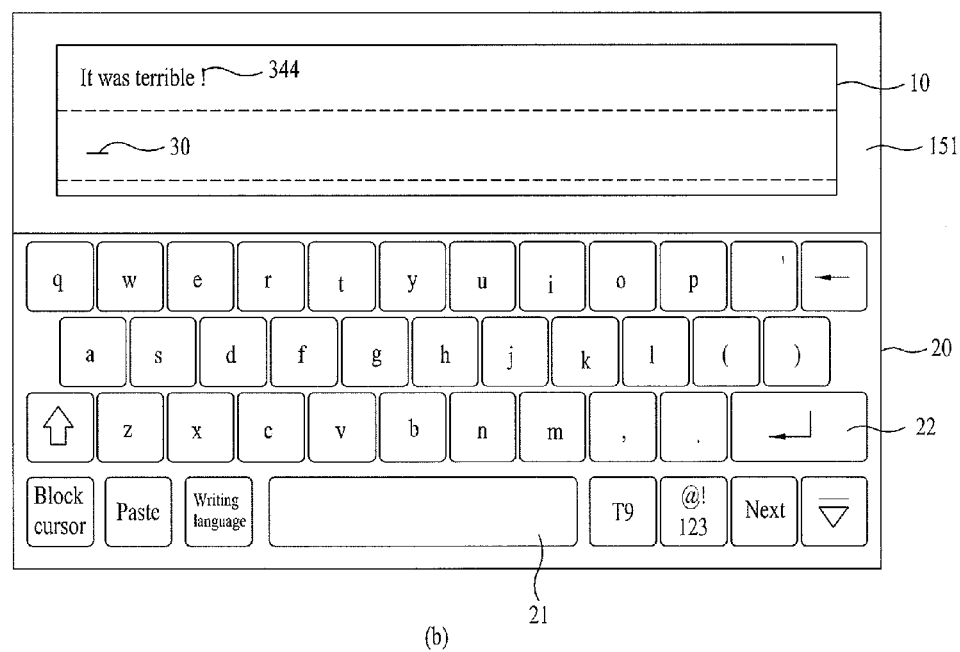
(b)

MOBILE TERMINAL AND METHOD FOR CONTROLLING THE SAME

CROSS REFERENCE TO RELATED APPLICATION

Pursuant to 35 U.S.C. §119(a), this application claims the benefit of earlier filing date and right of priority to Korean Application No. 10-2009-0093053, filed on Sep. 30, 2009, the contents of which are hereby incorporated by reference herein in their entirety.

BACKGROUND OF THE DISCLOSURE

1. Field of the Disclosure

The present invention relates to a mobile terminal that is able to represent mobile terminal usage putting user convenience into consideration and a method for controlling the same.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE DISCLOSURE

Accordingly, the present invention is directed to a mobile terminal and a method for controlling the same that substantially obviate one or more problems due to limitations and disadvantages of the related art.

An object of the present invention is to provide a mobile terminal that is able to input symbols used often when inputting characters and to input position moving of a pointer simultaneously, and a method for controlling the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen having a keypad displayed on a screen provided thereon, the keypad comprising a plurality of character keys and functional keys; and a controller moving a pointer after displaying a symbol mapped to a sensed touch gesture at a position of a pointer on the screen, if a preset touch gesture is sensed on the screen.

In another aspect of the present invention, a method for controlling a mobile terminal according to the present invention includes steps of inputting a touch gesture of a user on a touchscreen; mapping at least one symbol and a selected functional key to the touch gesture to store, if at least one symbol and a functional key having an assigned function of moving a pointer on the screen is selected; displaying on the touchscreen a keypad having two or more character keys and functional keys; displaying a symbol mapped to the touch gesture at the position of the pointer, if the touch gesture is sensed on the functional key; and applying the moving function assigned to the functional key to the pointer, if the symbol is displayed at the position of the pointer.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 7 and 8 are diagrams illustrating screens to describe a process of setting a touch gesture for inputting symbols and moving a pointer according to the present invention, respectively;

FIGS. 10 to 18 are diagrams illustrating screens to show moving of the pointer assigned to a space key and inputting symbols simultaneously by using the touch gesture, respectively; and FIGS. 19 to 24 are diagrams illustrating screens to show moving of the pointer assigned to an enter key and inputting symbols simultaneously by using the touch gesture, respectively.

DESCRIPTION OF SPECIFIC EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Moreover, 'pointer' used in the present invention may be referenced to as 'cursor' which is an indicator used to indicate a current point on a display, commonly displayed with a blocked shape "■" or "|".

Figure 1:
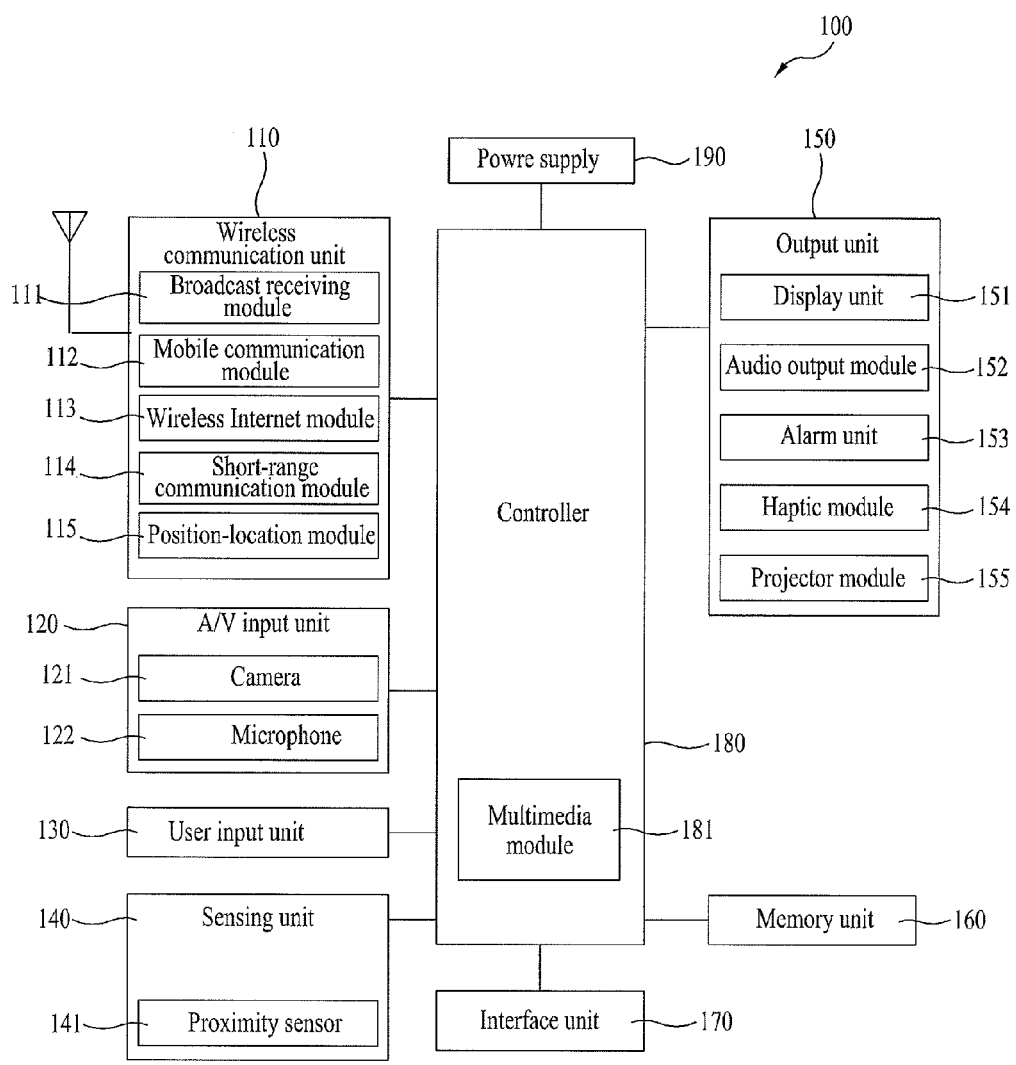
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-Convergence of Broadcast and Mobile Services (DVB-CBMS), Open Mobile Alliance Mobile Broadcast Services Enabler (OMA-BCAST), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 may be implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
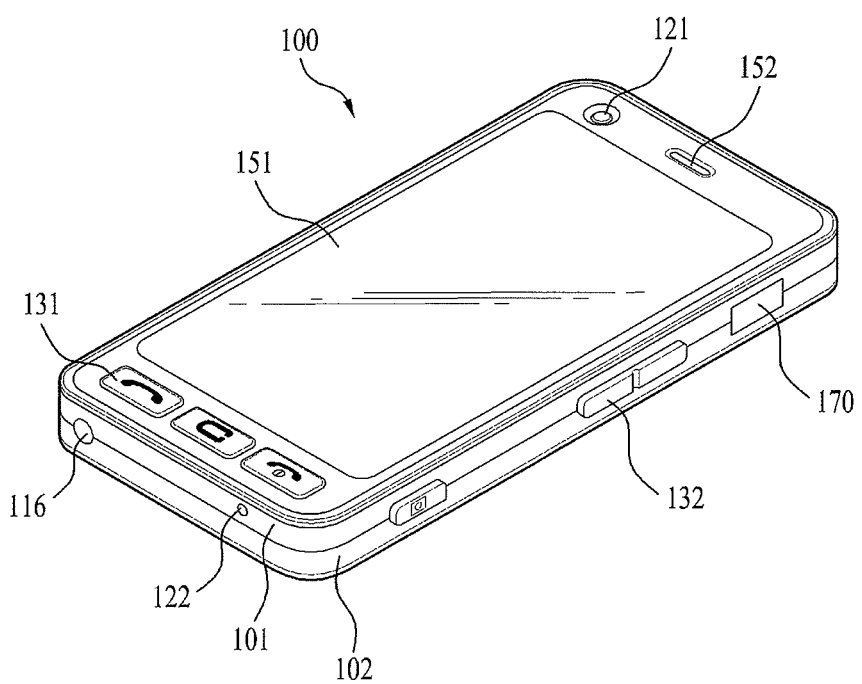
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
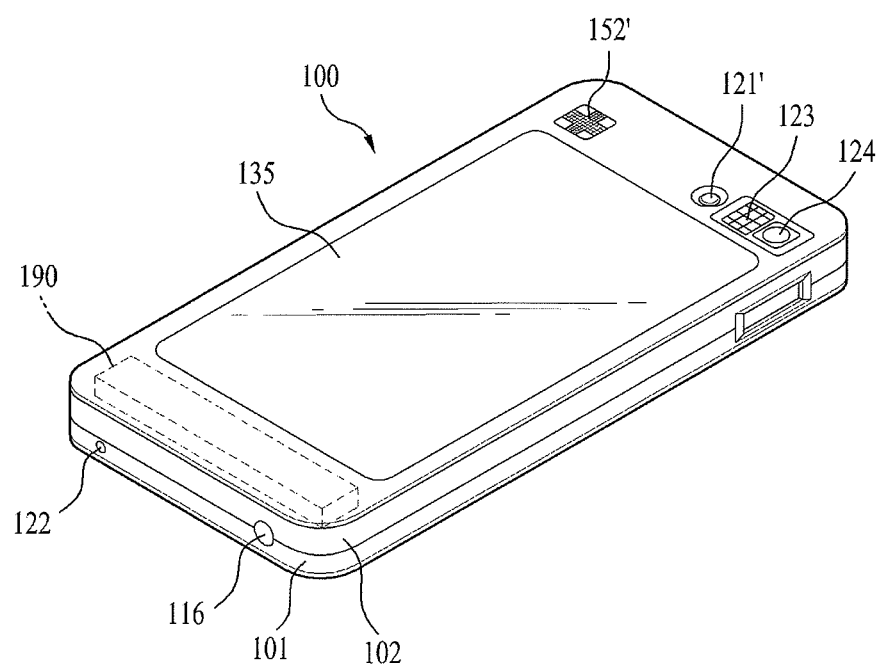
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Figure 3:
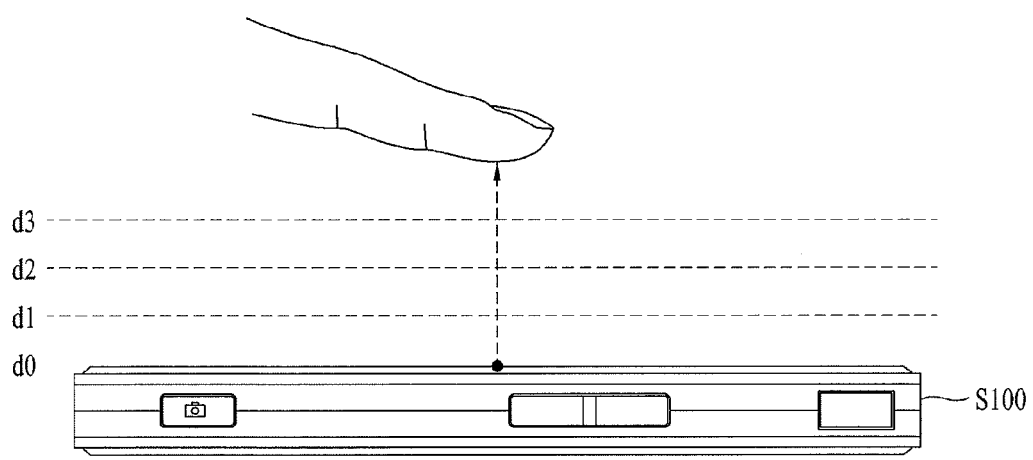
FIG. 3 is a conceptual diagram illustrating a proximity depth of a proximity sensor.

FIG. 3 is a conceptional diagram for explaining a proximity depth of a proximity sensor.

Referring to FIG. 3, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth').

In FIG. 3, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 4:
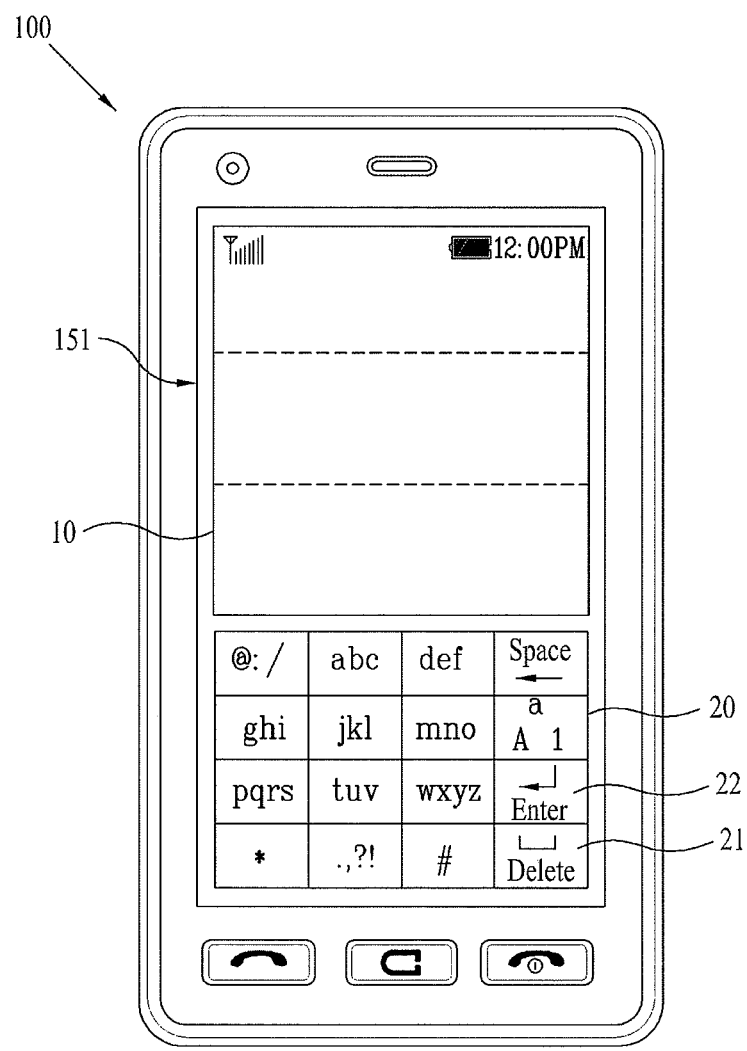
FIGS. 4 and 5 are diagrams illustrating an appearance of a keypad displayed on a touchscreen according to the present invention, respectively.
Figure 5:
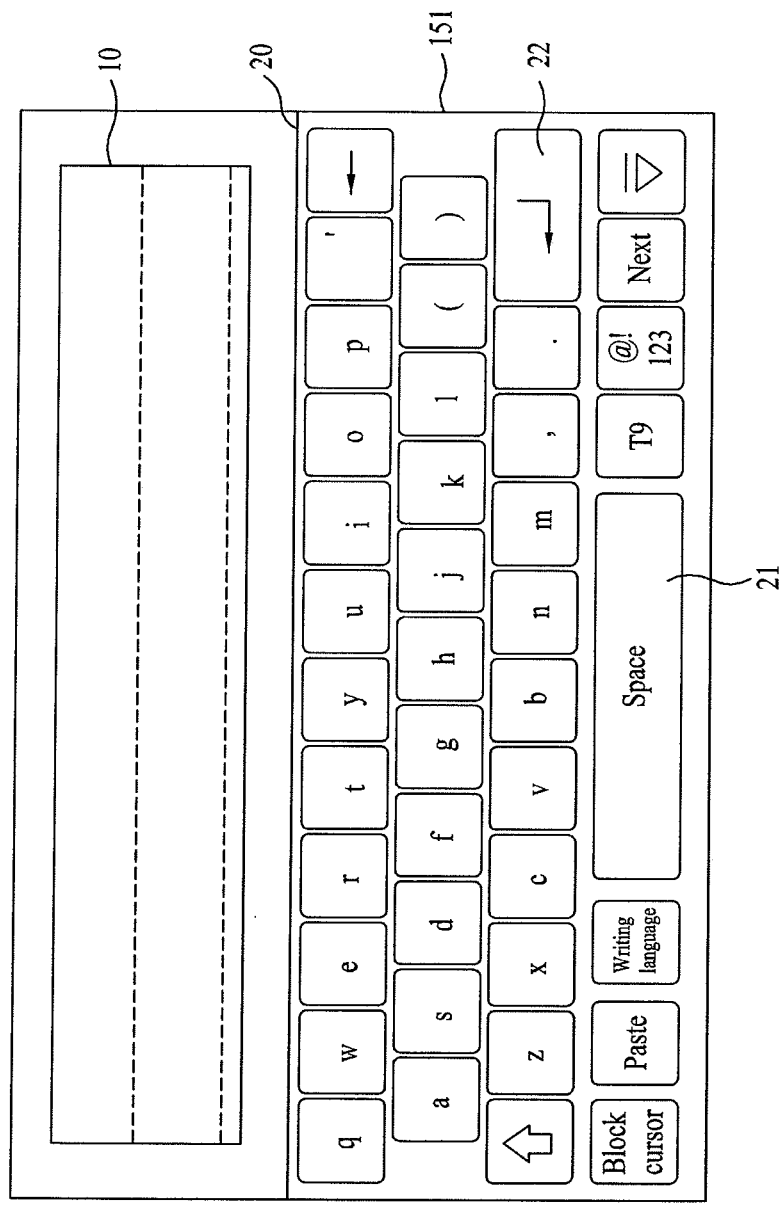

FIGS. 4 and 5 are diagrams illustrating appearances of keypads displayed on the touchscreen according to the present invention.

Diverse visual information may be displayed on the display 151 and such visual information of predetermined types may be displayed, for example, characters, numbers, symbols, graphics, icons and the like.

For the input of such the information, at least one of the characters, numbers, symbols, graphics and icons may be displayed in alignment to be represented as type of keypad. Such a keypad may be named as 'virtual keypad'.

FIG. 4 illustrates the touchscreen type display 151a displaying a 4×4 type keypad and a character window 10 for displaying characters, symbols and the like input on the keypad 20 according to the user's touch.

Here, the 4×4 type keypad 20 may have a similar configuration to a configuration of a keypad provided in a terminal having no touchscreen.

The keypad 20 may be configured of internal characters, alphabets, special characters, symbols, numeric keys and functional keys 21 and 22 having diverse assigned functions.

At this time, FIG. 4 shows a space key 21 having an assigned function of position moving of a pointer, in other words, cursor to the next space and an enter key 22 having an assigned function of position moving of the pointer, that is, cursor to a first front of the next line.

FIG. 5 shows the touchscreen type display 151 displaying a qwerty type keypad 20 and a character window 10 displaying characters and symbols and the like input on the keypad 20 according to the user's touch.

Here, the key configuration of the QWERTY type keypad 20 may be similar to that of a keyboard for a computer and portable computer and the like. Other keyboard configurations are possible.

As follows, embodiments of a method for controlling the terminal 100 will described in reference to corresponding drawings.

Figure 6:
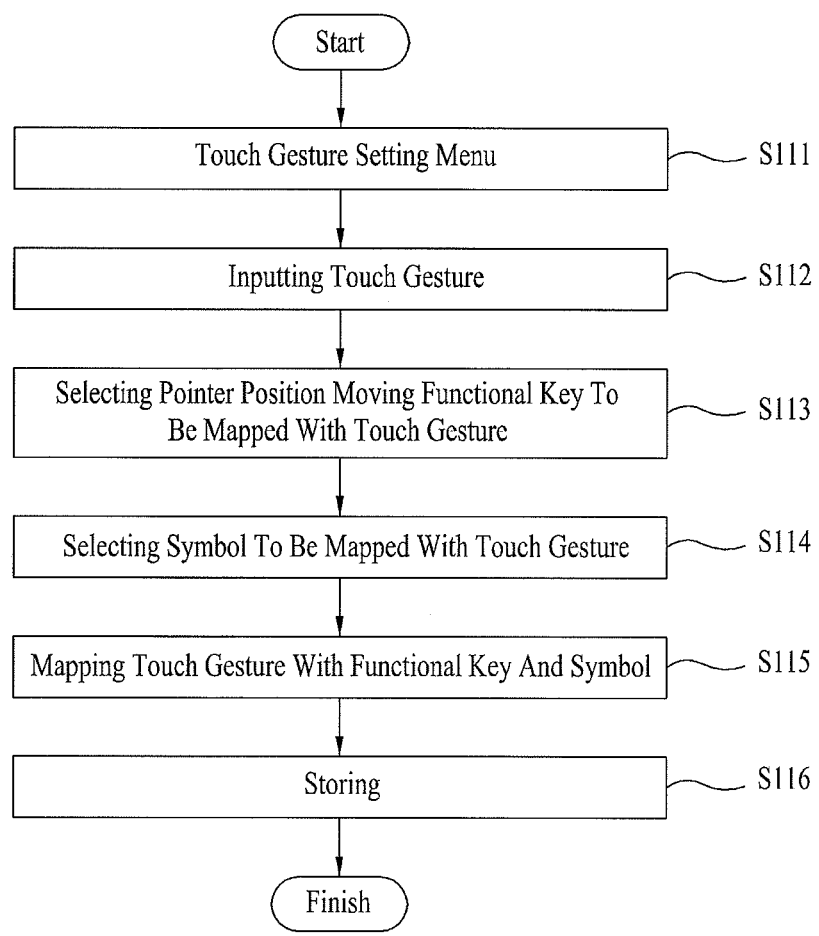

FIG. 6 is a flow chart illustrating a touch gesture setting process for moving the position of the pointer and for inputting a symbol according to the present invention.

FIGS. 7 and 8 are diagrams illustrating screens to describe the touch gesture setting process.

As follows, the touch gesture setting process for inputting symbols and for moving the position of the pointer will be described in reference to FIGS. 6 to 8.

In reference to FIG. 6, if the user selects a touch gesture setting menu for inputting the symbol and moving the position of the pointer, the controller 180 of the terminal 100 implements the touch gesture setting menu on the touchscreen 151 and it displays the implemented touch gesture setting menu on the touchscreen 151 [S111].

The controller 180 receives input of a touch gesture having a specific pattern on the touch gesture setting menu from the user [S112] and a functional key having the assigned function of the position moving of the pointer which will match with the input touch gesture [S113]. Then, if a symbol to be mapped with the touch gesture is selected [S114], the input touch gesture, the functional key and the symbol are mapped with each other [S115] and stored in the memory 160 by the controller 180 [S116].

At this time, the functional key for the position moving of the pointer may be one of a space key, enter key, tap key, page-up key, page-down key, home key and end key. The space key is configured to space the position of the pointer by a single space and the enter key is configured to move the position of the pointer to a first front of the next line. The page-up key is configured to move the position of the pointer to two former lines or more and the page-down key is configured to move the position of the pointer to next two lines or more. The home key is configured to move the pointer to the first of the screen and the end key is configured to move the pointer to the end of the screen.

The present invention will be described in detail, assuming that the functional key is the space key or the enter key. Not limiting the functional key thereto, the embodiments of the present invention may be applicable to the tap key, page-up key, page-down key, home key and end key.

FIG. 7 is illustrating a process of mapping the symbol and the space key to the touch gesture input by the user.

That is, in reference to FIG. 7A, if "3. Touch gesture setting" menu 310 is selected, the controller 180 displays a touch gesture setting window 320, a functional key selection window 330 for moving the position of the pointer on the screen and the symbol selection window 340.

At this time, according to FIG. 7B, a first touch gesture 321 having a first pattern is input by the user via the touch gesture setting window 320 and the space key 331 is selected from the functional key selection window 330 and a period (.) 342 is selected from the symbol selection window 3420.

For instance, if a touch gesture having the identical pattern to the first touch gesture 321 is input in a state of the first touch gesture 321 shown in FIG. 7B being stored in the memory 160, the controller 180 displays the period (.) 341 at the position of the pointer on the screen and the controller 180 spaces the position of the pointer by a single space.

The first pattern of the first touch gesture 321 may include contact-touch, proximity-touch, multi-touch touching two points on the screen, long-touch enabling the touch state kept for a predetermined time period. In addition, the first pattern includes dragging or flicking toward a first direction.

According to FIG. 7C, a second touch gesture 322 having a second pattern is input via the touch gesture setting window 320 by the user and the space key 331 is selected from the functional key selection window 330 and a comma (,) 342 is selected from the symbol selection window 340.

For instance, if a touch gesture having the identical pattern to the second touch gesture 322 is input on the space key displayed on the touchscreen 151 in a page creation in a state of the second touch gesture 322 shown in FIG. 7C being stored in the memory 160, the controller 180 displays the comma (,) 342 at the position of the pointer on the screen and the controller 180 spaces the position of the pointer by a single space. In other words, the controller 180 moves the pointer to the next space.

According to FIG. 7D, a third touch gesture 323 having a third pattern is input via the touch gesture setting window 320 by the user and the space key 331 is selected from the functional key selection window 330 and a question mark (?) 343 is selected from the symbol selection window 340.

For instance, if a touch gesture having the identical pattern to the third touch gesture 323 is input on the space key displayed on the touchscreen 151 in a page creation in a state of the third touch gesture 323 shown in FIG. 7D being stored in the memory 160, the controller 180 displays the question mark (?) 343 at the position of the pointer on the screen and the controller 180 spaces the position of the pointer by a single space. In other words, the controller 180 moves the pointer to the next space.

According to FIG. 7E, a fourth touch gesture 324 having a fourth pattern is input via the touch gesture setting window 320 by the user and the space key 331 is selected from the functional key selection key 330 and an exclamation mark (!) 344 is selected from the symbol selection window 340.

For instance, if a touch gesture having the identical pattern to the fourth touch gesture 324 is input on the space key displayed on the touchscreen 151 in a page creation, in a state of the fourth touch gesture 324 shown in FIG. 7E being stored in the memory 160, the controller 180 displays the exclamation mark (!) 344 at the position of the pointer on the screen and the controller 180 spaces the position of the pointer by a single space.

Moreover, if the first to fourth touch gestures 321, 322, 323 and 324 are input via the touch gesture setting window 320 by the user, the controller 180 may set a touch hold time of each input touch gesture 321, 322, 323 and 324 at a specific point, too.

For instance, when the user holds the touch for "1 second" at the last point of "■" which is the first touch gesture 321, the controller 180 sets the 1 second touch hold time together with the first pattern of the first touch gesture 321.

That is, in a state of both the first touch gesture 321 shown in FIG. 7B and the 1 second touch hold time being set in the memory 160, the touch gesture having the identical pattern to the first touch gesture 321 is input on the space key displayed on the touchscreen 151 in the page creation. After that, when "1 second" touch hold is sensed at the last point of the input "■" touch gesture, the controller 180 displays the period (.) 341 at the position of the pointer on the screen and the controller 180 spaces the position of the pointer by a single space.

FIG. 8 illustrates a process of mapping the symbol and enter key to the touch gesture input by the user.

That is, according to FIG. 8A, the first touch gesture 321 having the first pattern is input via the touch gesture setting window 320 by the user and the enter key 332 is selected from the functional key selection window 330 and the period (.) 341 is selected from the symbol selection window 340.

For instance, if a touch gesture having the identical pattern to the first touch gesture 321 is input on the enter key displayed on the touchscreen 151 in a page creation, in a state of the first touch gesture 321 shown in FIG. 8A being stored in the memory 160, the controller 180 displays the period (.) 341 at the position of the pointer on the screen and the controller 180 moves the position of the pointer to the first front of the next line.

According to FIG. 8B, the second touch gesture 322 having the second pattern is input via the touch gesture setting window 320 by the user and the enter key 332 is selected from the functional key selection window 330 and the comma (,) 342 is selected from the symbol selection window 340.

For instance, if a touch gesture having the identical pattern to the second touch gesture 322 is input on the enter key displayed on the touchscreen 151 in the page creation, in a state of the second touch gesture shown in FIG. 8B being stored in the memory 160, the controller 180 displays the comma (,) 342 at the position of the pointer on the screen and the controller 180 moves the position of the pointer to the first front of the next line.

According to FIG. 8C, the third touch gesture 323 having the third pattern is input via the touch gesture setting window 320 by the user and the enter key 332 is selected from the functional key selection window 330 and a question mark (?) 343 is selected from the symbol selection window 340.

For instance, if a touch gesture having the identical pattern to the third touch gesture 323 is input on the enter key displayed on the touchscreen 151 in the page creation, in a state of the third touch gesture 323 shown in FIG. 8C being stored in the memory 160, the controller 180 displays the question mark (?) 343 at the position of the pointer on the screen and the controller 180 moves the position of the pointer to the first front of the next line.

According to FIG. 8D, the fourth touch gesture 324 having the fourth pattern is input via the touch gesture setting window 320 by the user and the enter key 332 is selected from the functional key selection window 330 and an exclamation mark (!) 344 is selected from the symbol selection window 340.

For instance, if a touch gesture having the identical pattern to the fourth touch gesture 324 is input on the enter key displayed on the touchscreen 151 in the page creation, in a state of the fourth touch gesture 324 shown in FIG. 8D being stored in the memory 160, the controller 180 displays the exclamation mark (!) 344 at the position of the pointer on the screen and the controller 180 moves the position of the pointer to the first front of the next line.

Moreover, if the first to fourth touch gestures 321, 323, 323 and 324 are input via the touch gesture setting window 320 by the user, the controller 180 may set a touch hold time at a specific point of the input touch gestures 321, 322, 323 and 324, too.

For instance, when the user holds the touch for "1 second" at the last point of "■" which is the first touch gesture 321, the controller 180 sets the 1 second touch hold time together with the first pattern of the first touch gesture 321.

That is, in a state of both the first touch gesture 321 shown in FIG. 8A and the 1 second touch hold time being set in the memory, a touch gesture having the identical pattern to the first touch gesture 321 is input on the space key displayed on the touchscreen 151 in the page creation. After that, when "1 second" touch hold is sensed at the last point of the input "■" touch gesture, the controller 180 displays the period (.) 341 at the position of the pointer on the screen and the controller 180 moves the position of the pointer to the first front of the next line.

The process of setting the functional keys having the assigned functions of the pointer position moving corresponding to the touch gestures and setting the symbols is described in reference to FIGS. 6 to 8. However, the present invention is not limited to the above functions shown in FIGS. 6 to 8. That is, the present invention may set all kinds functional keys having the assigned position moving functions corresponding to touch gestures and all kinds of symbols.

As follows, the process of the pointer moving by way of the touch gesture according to the present invention simultaneously together with the symbol input will be described in detail in reference to FIGS. 9 to 24.

Figure 9:
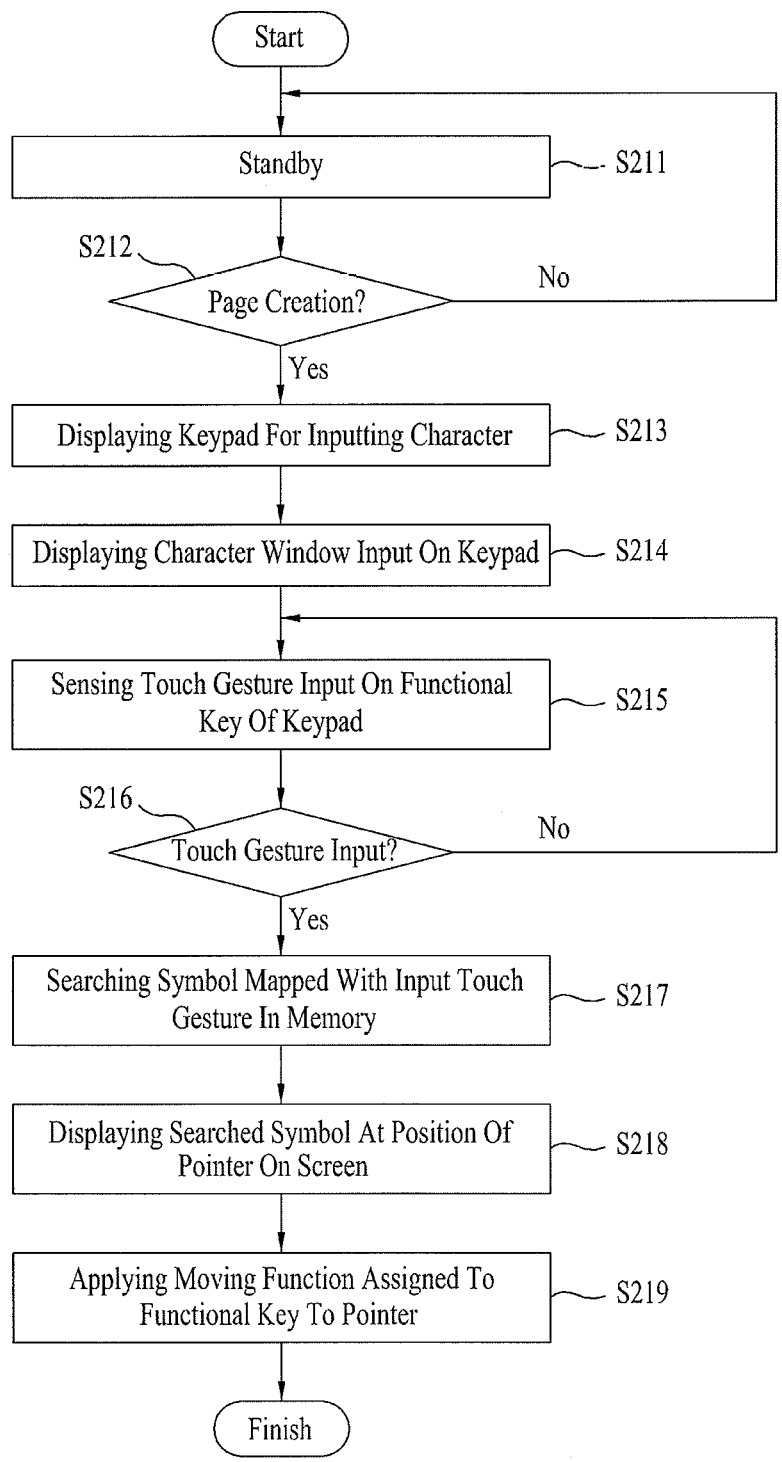
FIG. 9 is a flow chart illustrating a method for controlling symbol the input and the pointer moving simultaneously by using the touch gesture according to the present invention.
Figure 13:
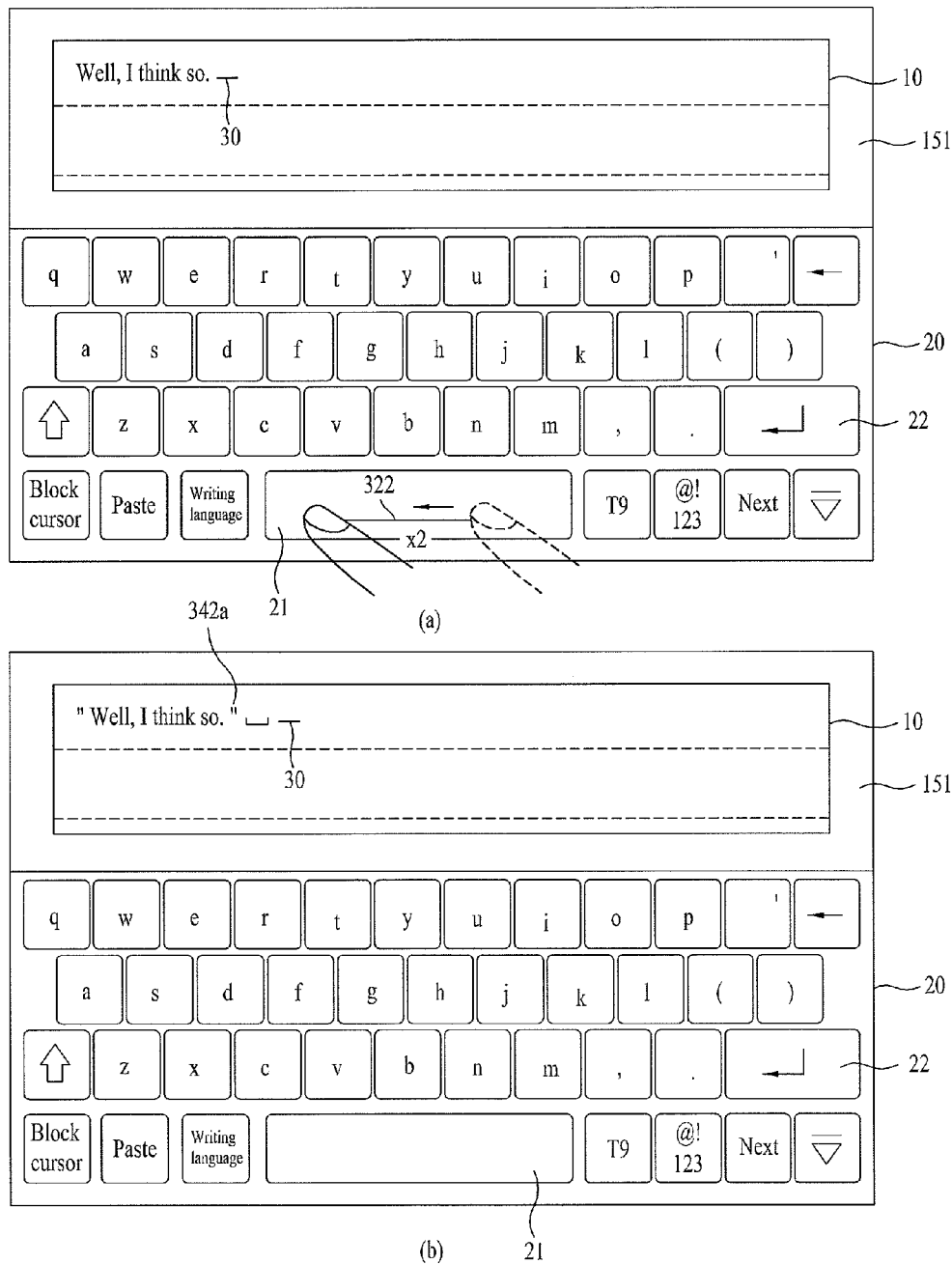
Figure 14:
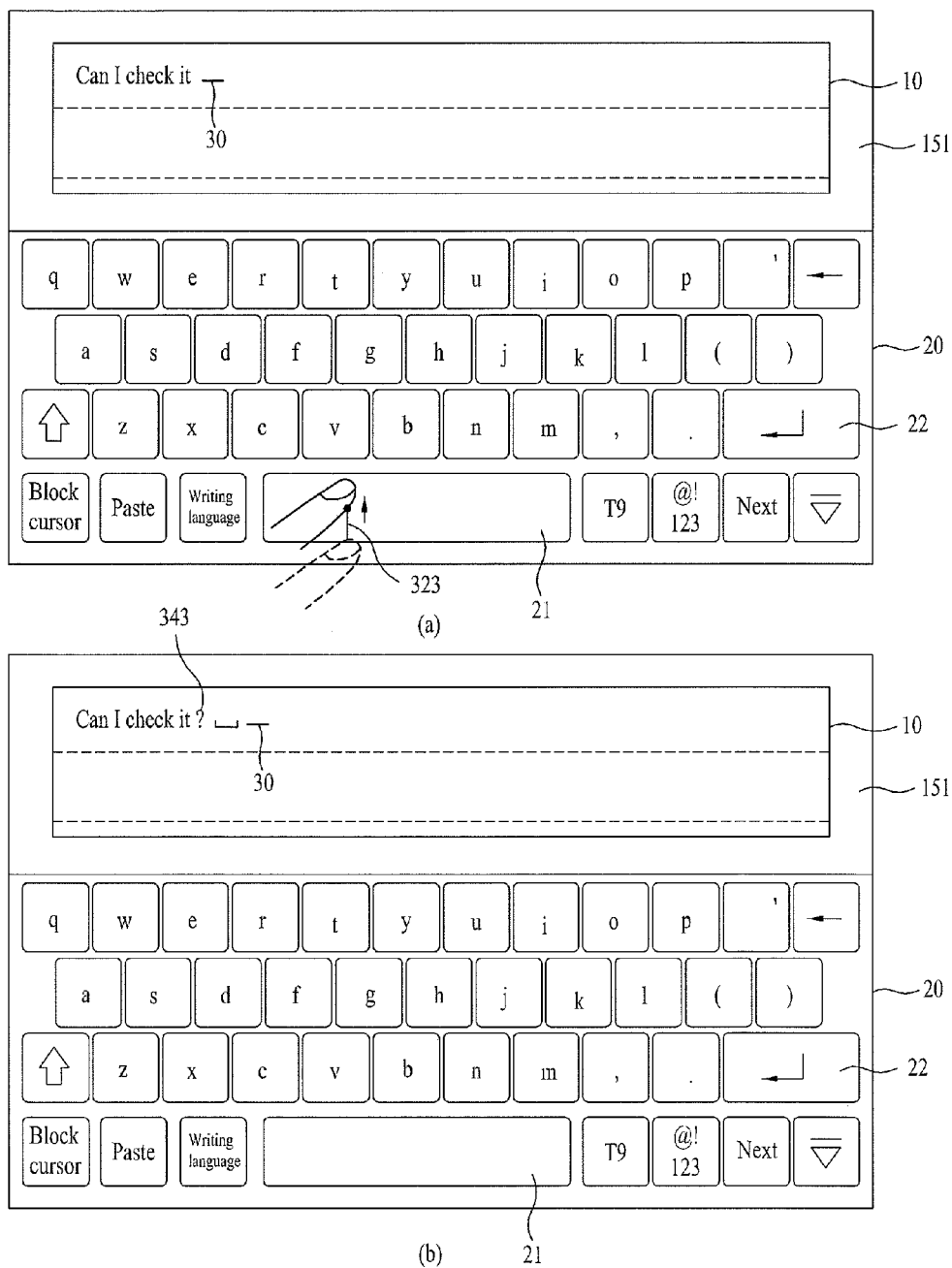
Figure 15:
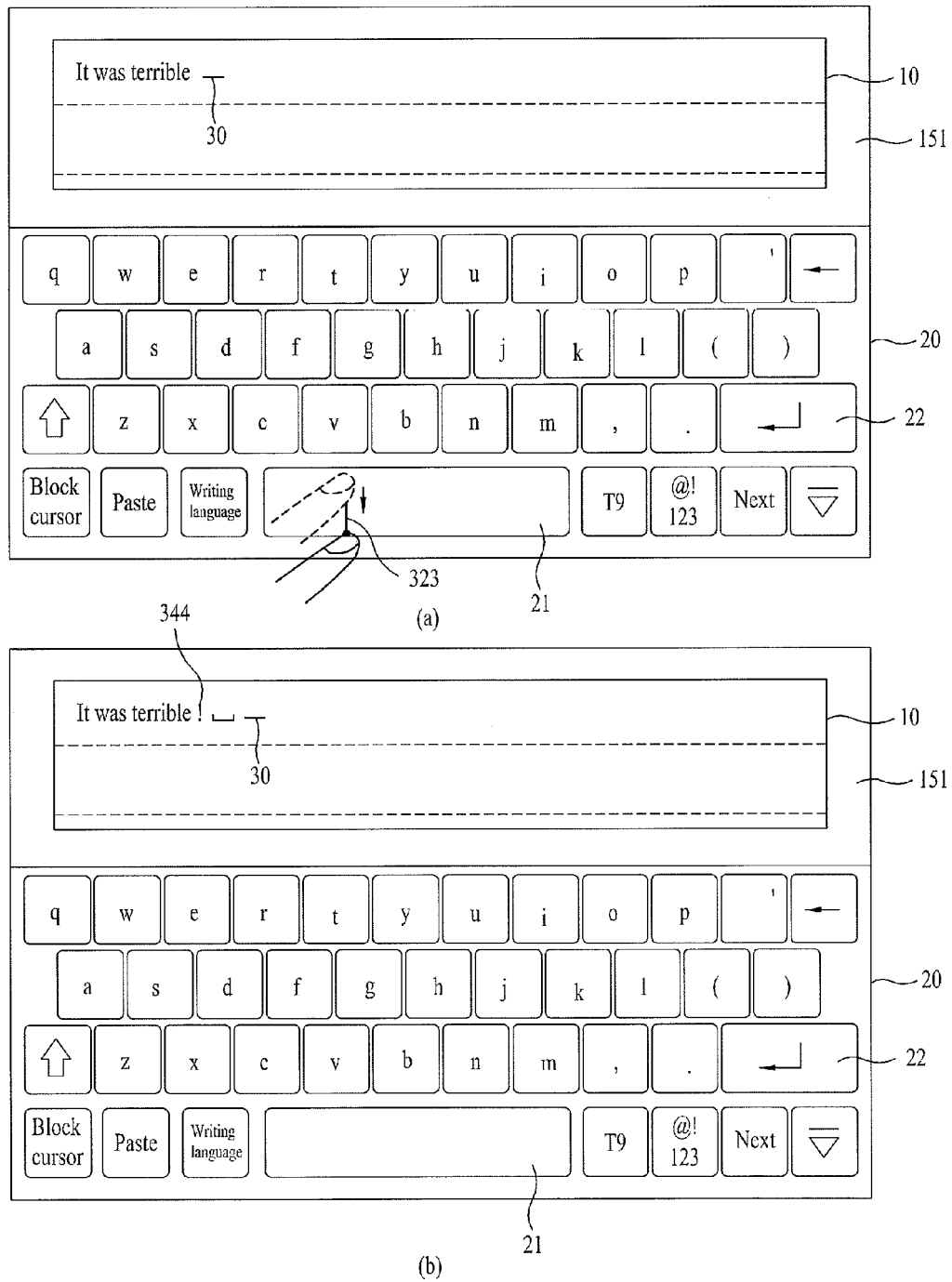
Figure 16:
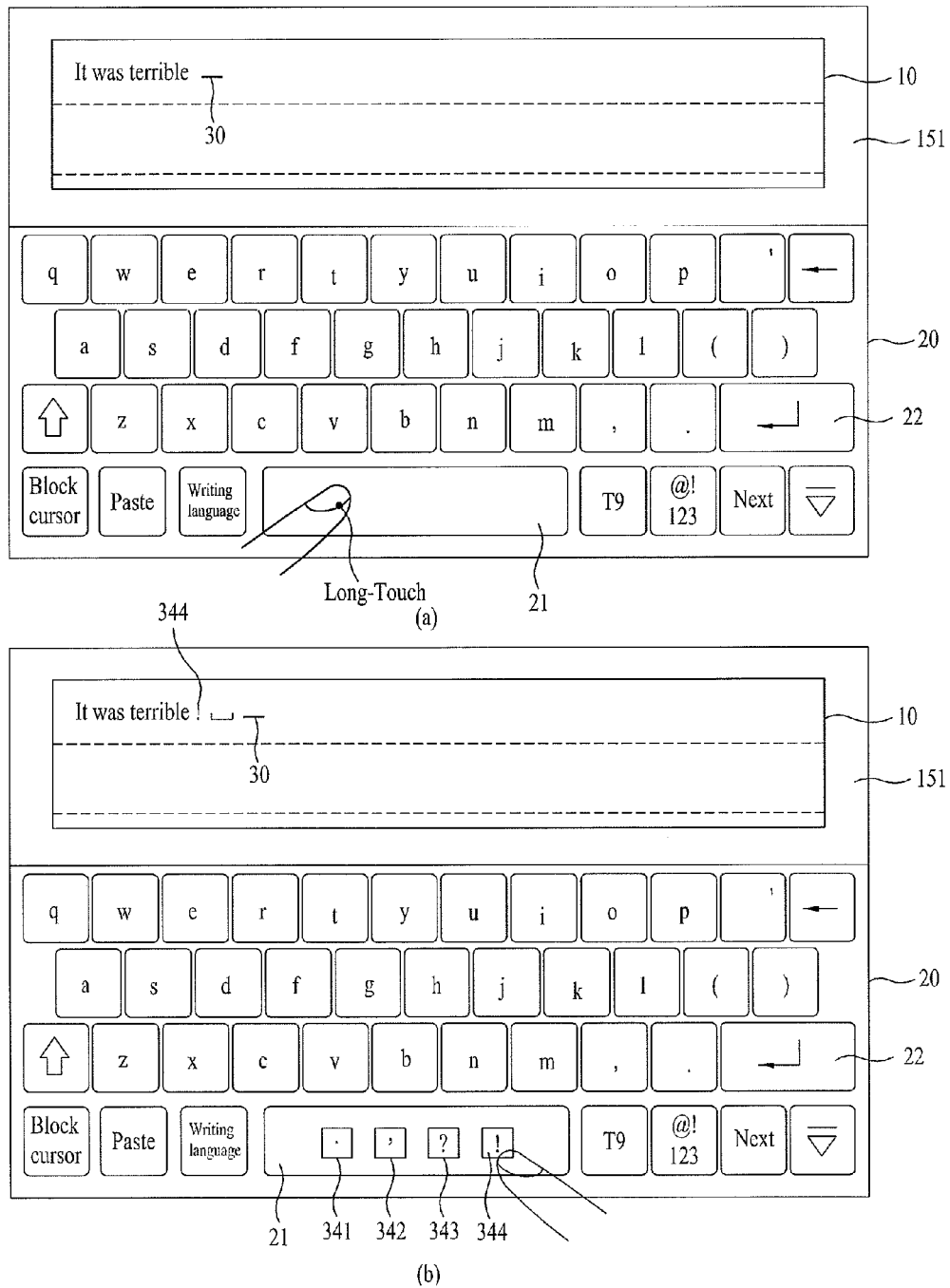
Figure 17:
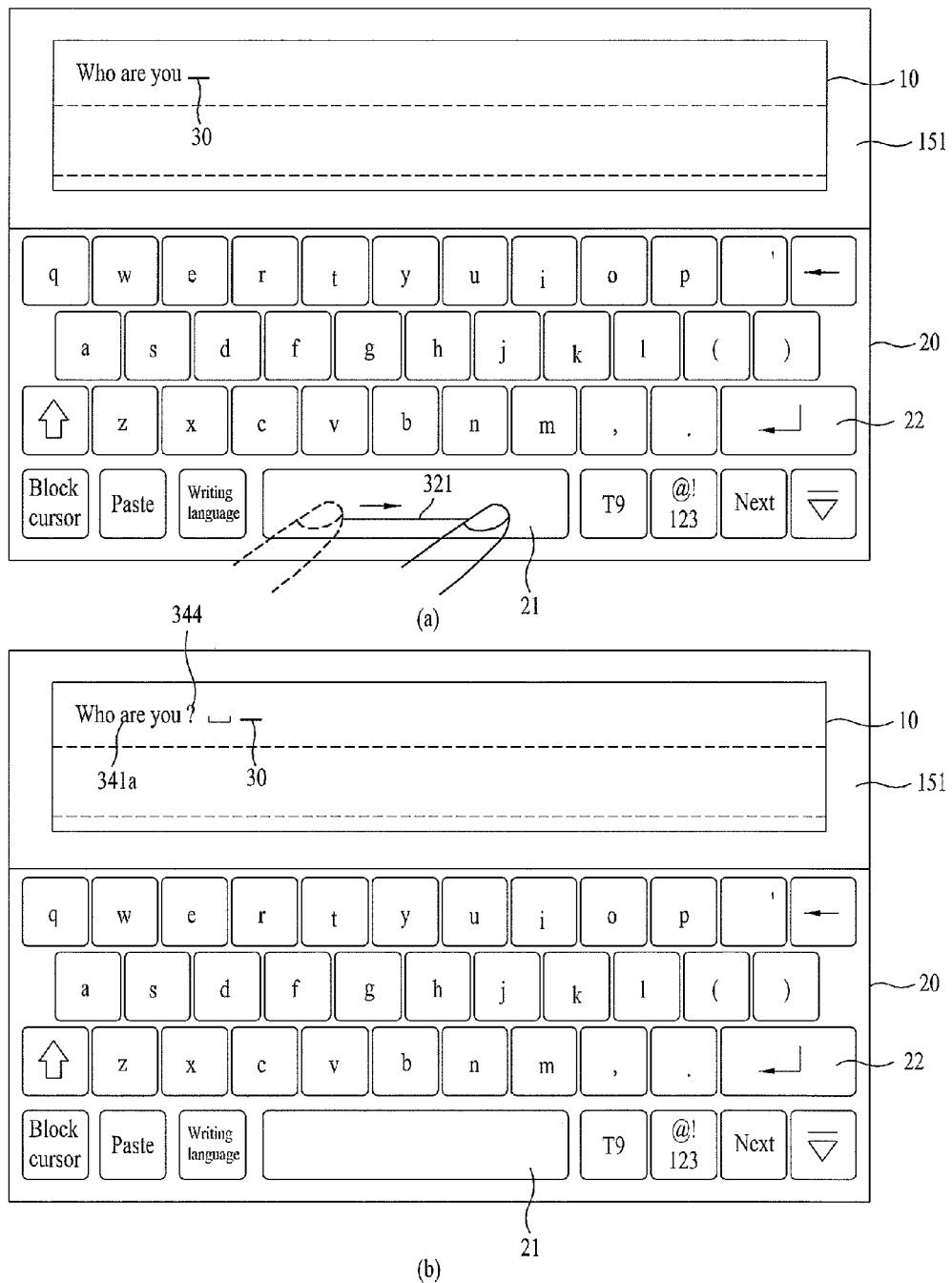
Figure 18:
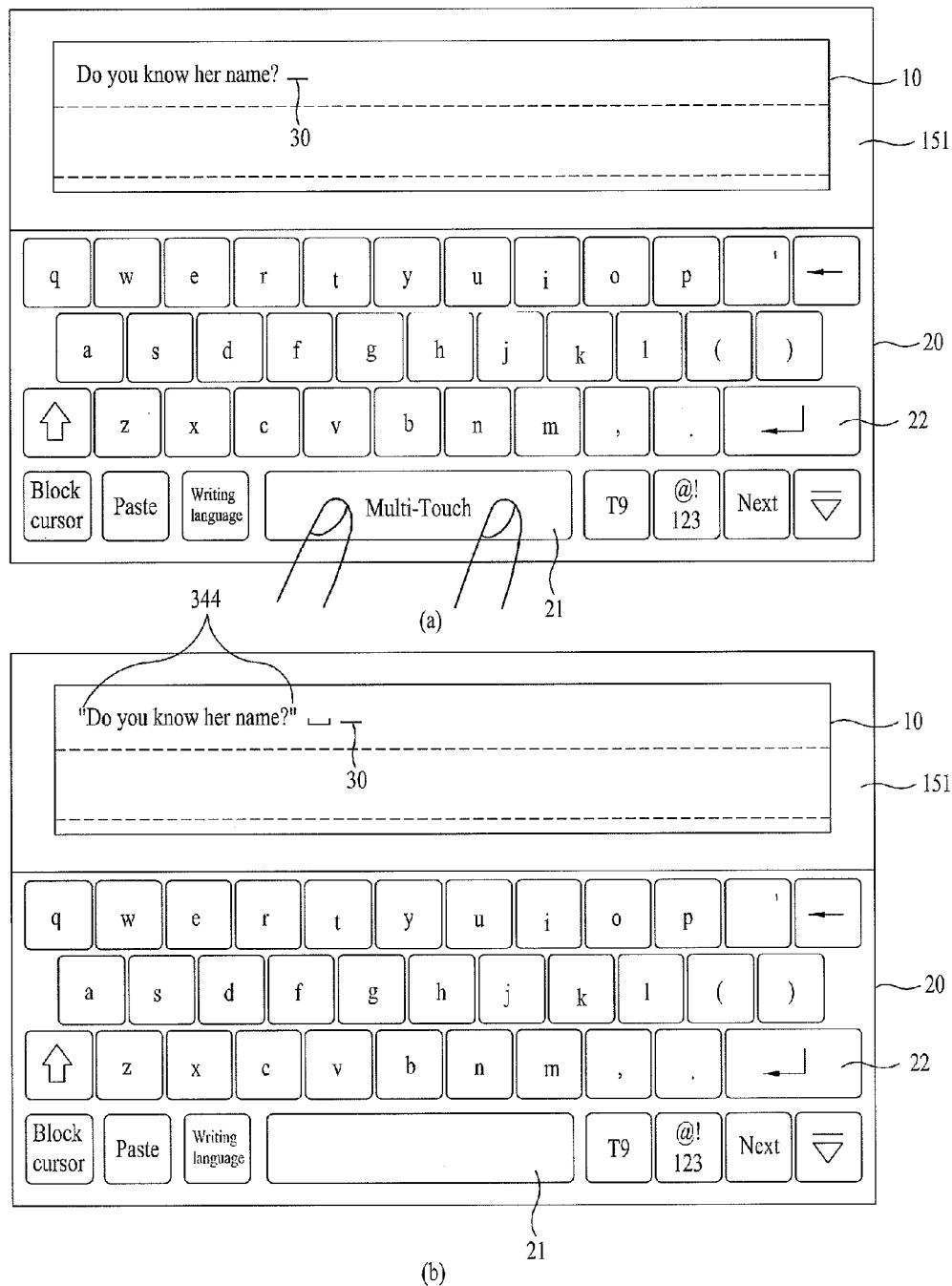

FIG. 9 is a flow chart illustrating a method for controlling the position moving of the pointer by way of touch gesture and inputting a symbol simultaneously.

FIGS. 10 to 18 are diagrams illustrating screens showing the position moving of the pointer assigned to the space key by way of the touch gesture, simultaneously together with the symbol input, respectively.

FIGS. 19 to 24 are diagrams illustrating screens showing position moving of a pointer assigned to the enter key by way of the touch gesture, simultaneously together with the symbol input, respectively.

In reference to FIG. 9, if a menu associated with character input is selected via the touch screen 151 or user input unit 130 in a standby [S211], the controller 180 of the terminal 100 converts a current operational condition into a page creation mode [S212] and it displays the keypad 20 for inputting characters [S213] and the character window 10 for displaying the character input from the key pad 20 [S214] on the touchscreen 151.

Here, the menu associated with the character input may include a phone book, message sensing, memo, schedule, D-day, electronic dictionary, e-mail sending menu and the like.

Functional keys having various assigned pointer position moving functions may be provided in the key pad 20 and the functional keys may include the space key, enter key, tap key, page-up key, page-down key, home key and end key. The space key is configured of moving the position of the pointer to the next space and the enter key is configured to move the position of the pointer to a first front of the next line. The tap key is configured to move the position of the pointer by plural spaces or more. The page up key is configured to move the position of the pointer to former two lines or more and the page down key is configured to move it to next two lines or more. The home key is configured to move the position of the pointer to the first front of the screen and the end key is configured to move it to the end of the screen.

The controller 180 senses whether a touch gesture is input on the functional keys provided in the key pad 20 from the user [S215].

If a touch gesture having a predetermined pattern is input on the functional key [S216], the controller 180 recognizes the pattern of the input touch gesture and it searches a touch gesture having the identical pattern to the recognized pattern in the memory 160 to figure out a symbol and functional key mapped with the touch gesture searched in the memory 160 [S217].

The controller 180 displays the figured out symbol at a current position of the pointer on the character window 10 [S218]. Once completing the display of the symbol, the controller 180 applies a moving function assigned to the figured out functional key to the pointer [S219].

For instance, if the period (.) and the space key are mapped with the touch gesture searched in the memory 160, the controller 180 displays the period (.) at the position of the pointer.

Once completing the display of the period, the controller moves the position of the pointer to the next space.

FIGS. 10 to 18 show the pointer position moving assigned to the space key and the symbol input by way of the touch gesture.

First of all, according to FIG. 10A, 'i think so' is displayed on the character window 10 provided in the touch screen 151, with the pointer 30 located in the next space of 'i think so'.

At this tie, if the first touch gesture 321 having the first pattern set as shown in FIGS. 6 to 8 is input, the controller 180 displays the period (.) 341 mapped with the first touch gesture 321 at the position of the pointer 30 and it moves the position of the pointer 30 to the next space of the position where the period (.) 341 is displayed, as shown in FIG. 10B.

Here, the first touch gesture 321 may be input by contact-touch or proximity-touch and the first pattern may be implemented by dragging or flicking from a left to right direction.

Next, according to FIG. 11A, 'Title' is displayed on the character window 10 of the touch screen 151, with the pointer 30 located in the next space of 'Title'.

If the first touch gesture 321 having the first pattern set as shown in FIGS. 6 to 8 is input on the space key 21 continuously more than two times, the controller 180 converts the period (.) 341 mapped with the first touch gesture 321 into a colon (:) 341*a* and it displays the converted colon (:) 341*a* at the position of the pointer 30, as shown in FIG. 11B.

Hence, the controller moves the position of the pointer 30 to the next one of the space where the colon (:) 341*a* is displayed.

Next, according to FIG. 12A, 'Well' is displayed on the character window 10 of the touchscreen 151, with the pointer located in the next space of 'Well'.

At this time, if the second touch gesture 322 having the second pattern set as shown in FIGS. 6 to 8 is input on the space key 21, the controller 180 displays the comma (,) 342 mapped with the second touch gesture 322 at the position of the pointer 30 and it moves the position of the pointer 30 to the next one of the space where the comma (,) 342 is displayed, as shown in FIG. 12B.

Hence, according to FIG. 13A, 'Well, I think so.' is displayed on the character window 10 of the touchscreen 151, with the pointer 30 located in the next space of 'Well, I think so.'

At this time, if the second touch gesture 322 having the second pattern set as shown in FIGS. 6 to 8 is input on the space key 21 continuously more than two times, the controller 180 converts the comma (,) 342 mapped with the second touch gesture 322 into double quote (") 342*a* and it displays the double quote (") 342*a* at the position of the pointer 30, as shown in FIG. 13B.

Hence, the controller 180 moves the position of the pointer 30 to the next one of the space where the double quotes (") 342*a* is displayed.

Next, according to FIG. 14A, 'Can I check it' is displayed on the character window 10 provided in the touchscreen 151, with the pointer 30 located in the next space of 'Can I check it'.

At this time, if the third touch gesture 323 having the third pattern set as shown in FIGS. 6 to 8 is input, the controller 180 displays the question mark (?) 343 mapped with the third touch gesture 323 at the position of the pointer 30 and it moves the position of the pointer 30 to the next one of the space where the question mark (?) 343 is displayed, as shown in FIG. 14B.

Next, according to FIG. 15A, 'It was terrible' is displayed on the character window 10 provided in the touchscreen 151, with the pointer 30 located in the next space of 'It was terrible'.

At this time, if the fourth touch gesture 324 having the fourth pattern set as shown in FIGS. 6 to 8 is input, the controller 180 displays the exclamation mark (!) 344 mapped with the fourth touch gesture 324 at the position of the pointer 30 and it moves the position of the pointer 30 to the next one of the space where the exclamation mark (!) 344 is displayed, as shown in FIG. 15B.

Next, according to FIG. 16(A), 'It was terrible' is displayed on the character window 10 provided in the touchscreen 151, with the pointer 30 located in the next space of 'It was terrible'.

At this time, if a preset touch gesture is input on the space key 21, the controller 180 may display all of the symbols 341, 342, 343 and 344 mapped with the space key 21 in the space key 21, as shown in FIG. 16B.

The preset touch gesture may be multi-touch touching two points on the screen or long-touch enabling the touch state kept for a predetermined time period. FIG. 16A shows that the touch gesture is the long touch.

The symbols 341, 342, 343 and 344 mapped with the space key 21 may be displayed inside the space key 21 as icons and as scroll in a horizontal or vertical direction. The symbols 341, 342, 343 and 344 mapped with multi-touch touching two points on the screen, long-touch enabling the touch state kept for a predetermined time period the space key 21 may be displayed outside the space key 21.

If one (344) of the symbols 341, 342, 343 and 344 is touched in the state of the symbols 341, 342, 343 and 344 being displayed inside the space key 21, the controller 180 displays the selected symbol 344 at the position of the pointer 30 and it moves the pointer 30 to the next space.

According to FIG. 17A, 'Who are you' is displayed on the character window 10 provided in the touchscreen 151, with the pointer 30 located in the next space of 'Who are you'.

At this time, if a preset touch gesture is input on the space key 21, the controller 180 detects whether 'Who are you' displayed on the character window 10 has a word corresponding to an interrogative pronoun preset in the memory 160.

The interrogative pronoun may include 'what, who, where, whom, whose and how'. Since there is the interrogative pronoun 'who' on the character window 10, the controller 180 displays the question mark (?) 344 at the position of the pointer 30 and it spaces the pointer to the next space, as shown in FIG. 16B.

According to FIG. 18A, 'Do you know her name?' is displayed on the character window 10 provided in the touchscreen 151, with the pointer 30 located in the next space of 'Do you know her name?'

At this time, if a preset touch gesture, that is, multi-touch is input on the space key 21, the controller 180 displays double quotes ("and") 345 in the first and end of the sentence 'Do you know her name?', respectively, and it moves the pointer to the next space as shown in FIG. 18B.

The processing of moving the pointer assigned to the space key and inputting symbols simultaneously by using the touch gesture has described in reference to FIGS. 10 to 18.

As follows, the process of moving the pointer assigned to the enter key and inputting symbols simultaneously by using the touch gesture will be described in detail in reference to FIGS. 19 to 24.

First of all, according to FIG. 19A, 'I think so' is displayed on the character window 10 provided in the touchscreen 151, with the pointer located in the next space of 'I think so'.

At this time, if the first touch gesture 321 having the first pattern set as shown in FIGS. 6 to 8 is input on the enter key 22, the controller 180 displays the period (.) 341 mapped with the first touch gesture 321 at the position of the pointer 30 and it moves the pointer to a first front of the next line as shown in FIG. 19B.

Next, according to FIG. 20A, 'Title' is displayed on the character window 10 provided in the touchscreen 151, with the pointer located in the next space of 'Title'.

At this time, if the first touch gesture 321 having the first pattern set as shown in FIGS. 6 to 8 is input on the enter key 22 continuously more than two times, the controller 180 converts the period (.) 341 mapped with the first touch gesture 321 into the colon (:) 341*a* and it displays the converted colon (:) 341*a* at the position of the pointer 30 as shown in FIG. 20B.

Hence, the controller 180 moves the pointer to the first front of the next line.

Next, according to FIG. 21A, 'Well' is displayed on the character window 10 provided in the touchscreen 151, with the pointer 30 located in the next space of 'Well'.

At this time, if the second touch gesture 322 having the second pattern set as shown in FIGS. 6 to 8 is input on the enter key 22, the controller 180 displays the comma (,) 342 mapped with the second touch gesture 322 at the position of the pointer 30 and it moves the pointer 30 to the first front of the next line as shown in FIG. 21B.

Next, according to FIG. 22A, 'Well, i think so' is displayed on the character window 10 provided in the touchscreen 151, with the pointer 30 located in the next space of "Well, i think so.', with the pointer 30 located in the next space of "Well, i think so.'

At this time, if the second touch gesture 322 having the second pattern set as shown in FIGS. 6 to 8 is input on the enter key 22 continuously more than two times, the controller 180 converts the comma (,) 342 mapped with the second touch gesture 322 into the double quote (") 342*a* and it displays the converted double quote (") 342*a* at the position of the pointer 30.

Next, according to FIG. 23A, 'Can I check it' is displayed on the character window 10 provided in the touchscreen 151, with the pointer 30 located in the next space of 'Can I check it'.

At this time, if the third touch gesture 323 having the third pattern set as shown in FIGS. 6 to 8 is input on the enter key 22, the controller 180 displays the question mark (?) 343 mapped with the third touch gesture 323 at the position of the pointer 30 and it moves the pointer 30 to the first front of the next line as shown in FIG. 23B.

Lastly, according to FIG. 24A, 'It was terrible' is displayed on the character window 10 provided in the touchscreen 151, with the pointer 30 located in the next space of 'It was terrible'.

At this time, if the fourth touch gesture 324 having the fourth pattern set as shown in FIGS. 6 to 8 is input on the enter key 22, the controller displays the exclamation mark (!) 344 mapped with the fourth touch gesture 323 at the position of the pointer 30 and it moves the pointer 30 to the next line.

The process of simultaneously displaying the symbols mapped to the touch gestures and applying the moving function assigned to the space key 21 or enter key 22 to the pointer on the screen according to the touch gesture input on the space key 21 or enter key 22 from the user has been described in detail.

However, the present invention may be applicable to not only the space key 21 or enter key 22 but also the tap key, page-up key, page-down key, home key and end key. Here, the tap key is configured to space the pointer by two spaces or more and the page-up key is configured to move the pointer to two former lines or more and the page-down key is configured to move the pointer to two next lines or more. The home key is configured to move the pointer to the first front of a screen and the end key is configured to move the pointer to the end of the screen.

For instance, if the first gesture set as shown in FIGS. 6 to 8 is input on the tap key, the period (.) is displayed at the pointer on the screen and the pointer is moved to next two spaces or more. If the first touch gesture is input on the end key, the period (.) is displayed at the pointer on the screen and the pointer is moved to the end of the screen.

As mentioned above, the mobile terminal and the method for controlling the mobile terminal according to the present invention may have following effects.

First of all, the symbols used often when characters are input and the flying single space function may be mapped to the touch gesture input from the user. After that, if the touch gesture is sensed on the functional key having the assigned function of flying the pointer to the next space, the mapped symbol is displayed at the position of the on the current screen and then the pointer is moved to the next space. As a result, the touch frequency for inputting characters may be reduced only to enable fast character input.

Furthermore, the symbols used often in character input and the function of moving the pointer to the next line may be mapped to touch gesture input from the user. After that, if the touch gesture is sensed on the functional key having the assigned function of moving the pointer to the next line, the mapped symbol is displayed at the position of the pointer on the current screen and then the pointer is moved to the next line. As a result, the touch frequency for inputting characters may be reduced only to enable fast character input.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a touchscreen configured to:
      display a keypad including a plurality of character keys and functional keys, and
      display a text box separate from the keypad;
   a memory configured to:
      store a first symbol, a plurality of different first touch gestures, and a first functional key mapped with each other, and
      store a second symbol, a plurality of different second touch gestures, and a second functional key mapped with each other; and
   a controller configured to:
      map a different first operation for each first touch gesture made on the first functional key of the keypad, and
      map a different second operation for each second touch gesture made on the second functional key of the keypad,
   the first operation being one of
      displaying a first symbol mapped to a detected first touch gesture and the first functional key at a position of a pointer displayed in the text box on the touchscreen, followed by a move of the pointer, and
      moving the pointer displayed in the text box in a direction mapped to the detected first touch gesture and the first functional key,
   the second operation being one of
      displaying a second symbol mapped to a detected second touch gesture and the second functional key at the position of the pointer displayed in the text box on the touchscreen, followed by the move of the pointer, and
      moving the pointer displayed in the text box in a direction mapped to the detected second touch gesture and the second functional key.

2. The mobile terminal of claim 1, wherein each of the detected first and second touch gestures is preset by a user.

3. The mobile terminal of claim 1, wherein the controller is configured to display at least one menu for setting each touch gesture, the first and second functional keys of the keypad, and the first and second symbols mapped to the detected first and second touch gestures and the first and second functional keys.

4. The mobile terminal of claim 1, wherein the first and second detected touch gestures further include one of:
   a drag contact or proximity touch,
   a flicking contact or proximity touch having a predetermined direction,
   a long touch for a predetermined time period,
   a multi touch touching two points on the screen, and
   a combination of different touches or contacts.

5. The mobile terminal of claim 1, wherein the symbol is a punctuation mark.

6. The mobile terminal of claim 5, wherein the punctuation mark is one of a comma, a period, an exclamation mark, a quotation mark, a parenthesis mark, an asterix, an ampersand, a colon, a semi-colon, a brace, a bracket, a currency mark, an "at" symbol, a hyphen, a forward slash, a backward slash, and a mathematical symbol.

7. The mobile terminal of claim 1, wherein each of the directions mapped to the first and second touch gestures and the first and second functional keys, respectively, is one of a backspace, a forward space, a move to a next line, a move to a previous line, and a tab.

8. The mobile terminal of claim 1, wherein the move of the pointer is one of a backspace, a forward space, a move to a previous line, and a tab.

9. A method of controlling a mobile terminal having a touchscreen and a controller, the method comprising:
   displaying, by the touchscreen, a keypad including a plurality of character keys and functional keys;
   displaying, by the touchscreen, a text box separate from the keypad;
   storing, by a memory in the mobile terminal, a first symbol, a plurality of different first touch gestures, and a first functional key mapped with each other;
   storing, by the memory, a second symbol, a plurality of different second touch gestures, and a second functional key mapped with each other;

mapping, by a controller in the mobile terminal, a different first operation for each first touch gesture made on the first functional key of the keypad; and mapping, by the controller, a different second operation for each second touch gesture made on the second functional key of the keypad;

wherein the first operation is one of
displaying a first symbol mapped to the detected first touch gesture and the first functional key at a position of a pointer displayed in the text box on the touchscreen, followed by a move of the pointer, and
moving the pointer displayed in the text box in a direction mapped to the detected first touch gesture and the first functional key, and wherein the second operation is one of
displaying a second symbol mapped to a detected second touch gesture and the second functional key at the position of the pointer displayed in the text box on the touchscreen, followed by the move of the pointer, and
moving the pointer displayed in the text box in a direction mapped to the detected second touch gesture and the second functional key.

10. The method of claim 9, wherein each of the detected first and second touch gestures is preset by a user.

11. The method of claim 9, further comprising:
displaying at least one menu for setting each touch gesture, the first and second functional keys of the keypad, and the first and second symbols mapped to the detected first and second touch gestures and the first and second functional keys.

12. The method of claim 9, wherein the first and second detected touch gestures further include one of:
a drag contact or proximity touch,
a flicking contact or proximity touch having a predetermined direction,
a long touch for a predetermined time period,
a multi touch touching two points on the screen, and
a combination of different touches or contacts.

13. The method of claim 9, wherein the symbol is a punctuation mark.

14. The method of claim 13, wherein the punctuation mark is one of a comma, a period, an exclamation mark, a quotation mark, a parenthesis mark, an asterix, an ampersand, a colon, a semi-colon, a brace, a bracket, a currency mark, an "at" symbol, a hyphen, a forward slash, a backward slash, and a mathematical symbol.

15. The method of claim 9, wherein each of the directions mapped to the detected first and second touch gestures and the first and second functional keys, respectively, is one of a backspace, a forward space, a move to a next line, a move to a previous line, and a tab.

16. The method of claim 9, wherein the move of the pointer is one of a backspace, a forward space, a move to a next line, a move to a previous line, and a tab.

17. The method of claim 9, wherein each of the detected first and second touch gestures is in a plane of the touchscreen or in a plane parallel to the plane of the touchscreen.

18. The mobile terminal of claim 1, wherein each of the detected first and second touch gestures is in a plane of the touchscreen or in a plane parallel to the plane of the touchscreen.

19. The mobile terminal of claim 1, wherein the first symbol and the plurality of different first touch gestures are mapped with the first functional key, not the other functional keys including the second functional key, and the second symbol and the plurality of different second touch gestures are mapped with the second functional key, not the other functional keys including the first functional key.

\* \* \* \* \*